US009361153B2

(12) United States Patent
Makino

(10) Patent No.: US 9,361,153 B2
(45) Date of Patent: Jun. 7, 2016

(54) MANAGEMENT SYSTEM AND CONTROL PROGRAM FOR MANAGEMENT SYSTEM

(71) Applicant: Hitachi, Ltd., Tokyo (JP)

(72) Inventor: Kazuya Makino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/427,921

(22) PCT Filed: Dec. 28, 2012

(86) PCT No.: PCT/JP2012/084126
§ 371 (c)(1),
(2) Date: Mar. 12, 2015

(87) PCT Pub. No.: WO2014/103029
PCT Pub. Date: Jul. 3, 2014

(65) Prior Publication Data
US 2015/0212853 A1     Jul. 30, 2015

(51) Int. Cl.
*G06F 9/46* (2006.01)
*G06F 9/48* (2006.01)
*G06F 9/50* (2006.01)
*G06F 11/30* (2006.01)

(52) U.S. Cl.
CPC ............ *G06F 9/4881* (2013.01); *G06F 9/5038* (2013.01); *G06F 11/30* (2013.01); *G06F 11/3006* (2013.01); *G06F 11/3055* (2013.01); *G06F 2209/508* (2013.01); *G06F 2209/5021* (2013.01)

(58) Field of Classification Search
CPC .................................................. G06F 9/5038
USPC ........................................................ 718/103
See application file for complete search history.

(56) References Cited

U.S. PATENT DOCUMENTS

| 5,428,547 A * | 6/1995 | Ikeda ................. G05B 19/4184 700/174 |
| 7,937,280 B1 * | 5/2011 | Leung ..................... G06Q 10/06 705/6 |
| 8,392,925 B2 * | 3/2013 | Ramesh .................. G06F 9/526 718/102 |

FOREIGN PATENT DOCUMENTS

| JP | 7-56770 A | 3/1995 |
| JP | 2004-220415 A | 8/2004 |
| JP | 2005-322024 A | 11/2005 |
| JP | 2006-318036 A | 11/2006 |

* cited by examiner

*Primary Examiner* — Qing Chen
*Assistant Examiner* — Clint Thatcher
(74) *Attorney, Agent, or Firm* — Volpe and Koenig, P.C.

(57) ABSTRACT

Provided is a management system, comprising an interface, a processor and a storage device, wherein the interface has coupled thereto at least one maintenance target machine to be a target of a maintenance operation, which is identified by one piece of identification information, and wherein the management system is configured to: store information indicating a scheduled start time and scheduled finish time of the maintenance operation; determine, based on the scheduled start time, the scheduled finish time, and a login and logout for the maintenance operation on the at least one maintenance target machine detected by the management system, whether or not the maintenance operation is in execution on the at least one maintenance target machine; and determine, based on a result of the determination, whether or not to execute predetermined processing associated with an event transmitted from the at least one maintenance target machine.

14 Claims, 29 Drawing Sheets

EVENT TABLE

| EVENT ID 801 | MESSAGE 802 | LEVEL OF IMPORTANCE 803 | TRANSMISSION SOURCE 804 | ACTION STATE 805 | EVENT TYPE 806 | EVENT OCCURRENCE TIME 807 |
|---|---|---|---|---|---|---|
| EVENT 080 | MAINTENANCE OPERATION A | ERROR | MACHINE A | UNEXECUTED | NORMAL | 2012/01/01 12:30:00 |
| ... | ... | ... | ... | ... | ... | ... |

ACTION TABLE 606

| ACTION NAME 901 | PRIORITY 902 | ACTION CONDITION (ATTRIBUTE NAME) 903 | ACTION CONDITION (ATTRIBUTE VALUE) 904 | ACTION CONDITION (CONDITION) 905 | EXECUTION HOST 906 | EXECUTION USER 907 | ACTION 908 |
|---|---|---|---|---|---|---|---|
| MAINTENANCE | 1 | [EVENT TYPE] | [MAINTENANCE] | [MATCH] | NONE | NONE | NONE |
| recovery | 2 | [EVENT ID, LEVEL OF IMPORTANCE] | [EVENT 080, ERROR] | [MATCH, EQUAL TO OR MORE] | MACHINE A | USER A | recovery.bat |
| ... | ... | ... | ... | ... | ... | ... | ... |

Fig. 9

MAINTENANCE SCHEDULE TABLE

| SCHEDULED MAINTENANCE START TIME | SCHEDULED MAINTENANCE FINISH TIME | MAINTENANCE OPERATION NAME |
|---|---|---|
| 2012/01/01 0:00 | 2012/01/02 10:00 | MAINTENANCE OPERATION A |
| ... | ... | ... |

*Fig. 10*

MAINTENANCE OPERATION TABLE

| ID | MAINTENANCE OPERATION NAME | MAINTENANCE OPERATION NUMBER | MAINTENANCE TARGET MACHINE | ACCOUNT FOR MAINTENANCE OPERATION | OPERATION STATE | LOGIN COUNT |
|---|---|---|---|---|---|---|
| 1 | MAINTENANCE OPERATION A | 1 | MACHINE A | USER A1 | UNFINISHED | 0 |
| 2 | MAINTENANCE OPERATION A | 2 | MACHINE B | USER A1 | UNFINISHED | 0 |
| 3 | MAINTENANCE OPERATION A | 3 | MACHINE C | USER A2 | UNFINISHED | 0 |
| ... | ... | ... | ... | ... | ... | ... |

*Fig. 11*

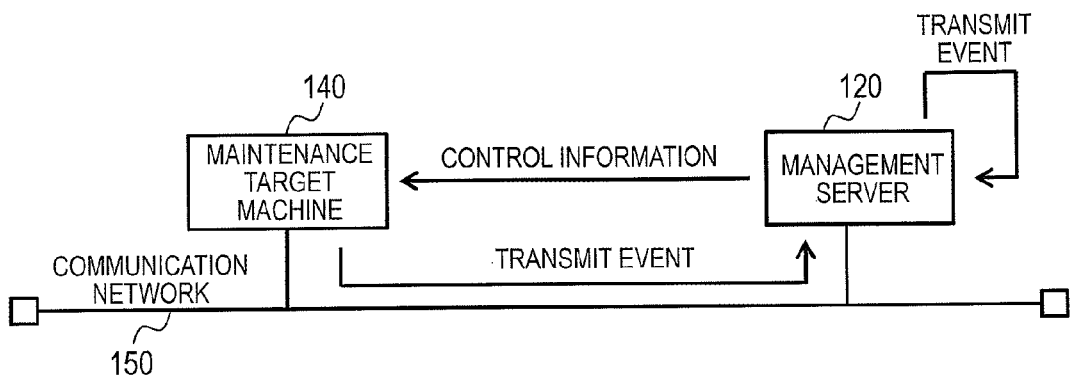

Fig. 14A

DETAILS OF TRANSMITTED EVENT OF EACH EVENT TYPE
(FROM MAINTENANCE TARGET MACHINE TO MANAGEMENT SERVER)

■NORMAL 1400

| EVENT OCCURRENCE TIME | 1401 |
| EVENT ID | 1402 |
| MESSAGE | 1403 |
| TRANSMISSION SOURCE | 1404 |
| EVENT TYPE | 1405 |

■MAINTENANCE 1410

| EVENT OCCURRENCE TIME | 1411 |
| EVENT ID | 1412 |
| MESSAGE | 1413 |
| TRANSMISSION SOURCE (MAINTENANCE TARGET MACHINE) | 1414 |
| EVENT TYPE | 1415 |

■LOGIN (FIRST TIME) 1420

| TRANSMISSION SOURCE (MAINTENANCE TARGET MACHINE) | 1421 |
| ACCOUNT FOR MAINTENANCE OPERATION | 1422 |
| EVENT TYPE | 1423 |

■LOGOUT 1440

| MAINTENANCE OPERATION NAME | 1441 |
| MAINTENANCE OPERATION NUMBER | 1442 |
| TRANSMISSION SOURCE (MAINTENANCE TARGET MACHINE) | 1443 |
| ACCOUNT FOR MAINTENANCE OPERATION | 1444 |
| EVENT TYPE | 1445 |

■LOGIN (SECOND OR SUBSEQUENT TIME) 1430

| MAINTENANCE OPERATION NAME | 1431 |
| MAINTENANCE OPERATION NUMBER | 1432 |
| EVENT TYPE | 1433 |

Fig. 14B

DETAILS OF TRANSMITTED EVENT OF EACH EVENT TYPE
(FROM MANAGEMENT SERVER TO MANAGEMENT SERVER)

CONTROL INFORMATION (FROM MANAGEMENT
SERVER TO MAINTENANCE TARGET MACHINE)

MANAGEMENT SERVER / FIRST EXAMPLE OF
MAINTENANCE SCHEDULE ENTRY SCREEN                                      2600

MAINTENANCE SCHEDULE ENTRY SCREEN

MAINTENANCE OPERATION NAME: [ MAINTENANCE OPERATION 1 ] 2601

MAINTENANCE OPERATION TARGET:  2602

| # | MAINTENANCE TARGET MACHINE | ACCOUNT FOR MAINTENANCE OPERATION |
|---|---|---|
| 1 | MACHINE1 | ACCOUNT1 |
| 2 | MACHINE2 | ACCOUNT1 |
| 3 | MACHINE3 | ACCOUNT2 |
| 4 | MACHINE4 | ACCOUNT2 |

SCHEDULED MAINTENANCE OPERATION PERIOD:

[ DESIGNATE DATE ] 2603  [ DESIGNATE MACHINE ] 2604                     2607

DATE:  [ 2012/01/10 ▼ ] 2605

| MACHINE NAME | 0:00 | 12:00 | 24:00 | 2606 |
|---|---|---|---|---|
| MACHINE 1 | | | | |
| MACHINE 2 | | | | |
| MACHINE 3 | | | | |
| MACHINE 4 | | | | |

[ OK ] 2608   [ Cancel ] 2609

*Fig. 26*

MANAGEMENT SERVER / SECOND EXAMPLE OF
MAINTENANCE SCHEDULE ENTRY SCREEN 2600

MAINTENANCE SCHEDULE ENTRY SCREEN

MAINTENANCE OPERATION NAME: [MAINTENANCE OPERATION 1] 2601

MAINTENANCE OPERATION TARGET: 2602

| # | MAINTENANCE TARGET MACHINE | ACCOUNT FOR MAINTENANCE OPERATION | |
|---|---|---|---|
| 1 | MACHINE1 | ACCOUNT1 | ▲ |
| 2 | MACHINE2 | ACCOUNT1 | |
| 3 | MACHINE3 | ACCOUNT2 | |
| 4 | MACHINE4 | ACCOUNT2 | ▼ |

SCHEDULED MAINTENANCE OPERATION PERIOD:

[DESIGNATE DATE] 2603 | [DESIGNATE MACHINE] 2604       2607

MACHINE NAME: [MACHINE1 ▼] 2701

| DATE | 0:00 | 12:00 | 24:00 | |
|---|---|---|---|---|
| 2012/01/10 | | ██████████ | | ▲ |
| 2012/01/11 | | ████ | | |
| 2012/01/12 | | | | |
| 2012/01/13 | | | | ▼ |

2702

[OK] 2608   [Cancel] 2609

*Fig. 27*

MANAGEMENT SERVER / EXAMPLE OF EVENT DISPLAY SCREEN

| EVENT DISPLAY SCREEN | | | |
|---|---|---|---|
| STATE | Error | | 2801 |

EVENT LIST: 2802

| # | LEVEL OF IMPORTANCE | EVENT ID | MAINTENANCE TARGET MACHINE |
|---|---|---|---|
| 1 | Info | MESSAGE0131 | MACHINE1 |
| 2 | Warning | MESSAGE0025 | MACHINE3 |
| 3 | Info | MESSAGE0018 | MACHINE1 |
| 4 | Error | MESSAGE0018 | MACHINE2 |

Fig. 28

MANAGEMENT SYSTEM AND CONTROL PROGRAM FOR MANAGEMENT SYSTEM

BACKGROUND OF THE INVENTION

This invention relates to a management system for a computer system to which integrated operation management software is applied.

As a background art in the technical field of this invention, there is known Japanese Patent Application Laid-open No. 2006-318036. Japanese Patent Application Laid-open No. 2006-318036 (see Abstract) describes the following: "provided is a failure monitoring system for automatically changing, when a need for switching a monitoring state of a monitoring target machine 1 arises, filtering characteristics of management information based on schedule information in order to eliminate an error in operation when a manual switching operation is performed and to continuously execute a monitoring task. The failure monitoring system includes: a plurality of monitoring target machines 1 for regularly outputting management information when operating; a monitoring apparatus 2 for filtering respective pieces of management information output from the plurality of monitoring target machines 1 under a predetermined condition to select a piece of management information indicating an abnormality as failure information, and outputting the selected failure information; and a maintenance center 3 for receiving the failure information output from the monitoring apparatus 2. The filtering performed by the monitoring apparatus 2 on the respective pieces of management information under the predetermined condition includes: a first filtering, which is performed in accordance with determination as to whether the management information is normal or abnormal which is set for each of the monitoring target machines 1; and a second filtering for determining, for each of the plurality of monitoring target machines 1, whether or not the determination of the abnormality made by the first filtering is invalid based on status information indicating a running state of the each of the plurality of monitoring target machines 1."

SUMMARY OF THE INVENTION

According to the disclosure of Japanese Patent Application Laid-open No. 2006-318036, the filtering is automatically switched from one to another based on the schedule so that a user is not notified of an event caused by a maintenance operation. In Japanese Patent Application Laid-open No. 2006-318036, however, the fact that the maintenance operation period registered in the schedule differs from the actual maintenance operation period is not taken into consideration.

In order to solve the foregoing problem, this invention provides a management system comprises an interface coupled to a network, a processor coupled to the interface, and a storage device coupled to the processor, wherein the interface has coupled thereto at least one maintenance target machine to be a target of a maintenance operation, which is identified by one piece of identification information, and wherein the management system is configured to: store information indicating scheduled start time and scheduled finish time of the maintenance operation; determine, based on the scheduled start time, the scheduled finish time, and a login and logout for the maintenance operation on the at least one maintenance target machine detected by the management system, whether or not the maintenance operation is in execution on the at least one maintenance target machine; and determine, based on a result of the determination, whether or not to execute predetermined processing associated with an event transmitted from the at least one maintenance target machine.

According to one embodiment of this invention, an accuracy of the automatic determination as to whether or not the event in question is the maintenance event is enhanced. Objects, configurations, and effects other than those described above become apparent from the following description of an embodiment of this invention.

BRIEF DESCRIPTION OF THE DRAWINGS

FIG. 8 is an explanatory diagram of an event table stored in the management server according to the embodiment of this invention.

FIG. 9 is an explanatory diagram of an action table stored in the management server according to the embodiment of this invention.

FIG. 10 is an explanatory diagram of a maintenance schedule table stored in the management server according to the embodiment of this invention.

FIG. 11 is an explanatory diagram of a maintenance operation table stored in the management server according to the embodiment of this invention.

FIG. 14A is an explanatory diagram of event and control information transmitted and received between the maintenance target machine and the management server according to the embodiment of this invention.

FIG. 14B is an explanatory diagram of details of the events transmitted from the maintenance target machine to the management server according to the embodiment of this invention.

FIG. 26 is an explanatory diagram of a first example of a maintenance schedule entry screen according to the embodiment of this invention.

FIG. 27 is an explanatory diagram of a second example of the maintenance schedule entry screen according to the embodiment of this invention.

FIG. 28 is an explanatory diagram of an event display screen according to the embodiment of this invention.

DETAILED DESCRIPTION OF THE PREFERRED EMBODIMENT

Figure 1:
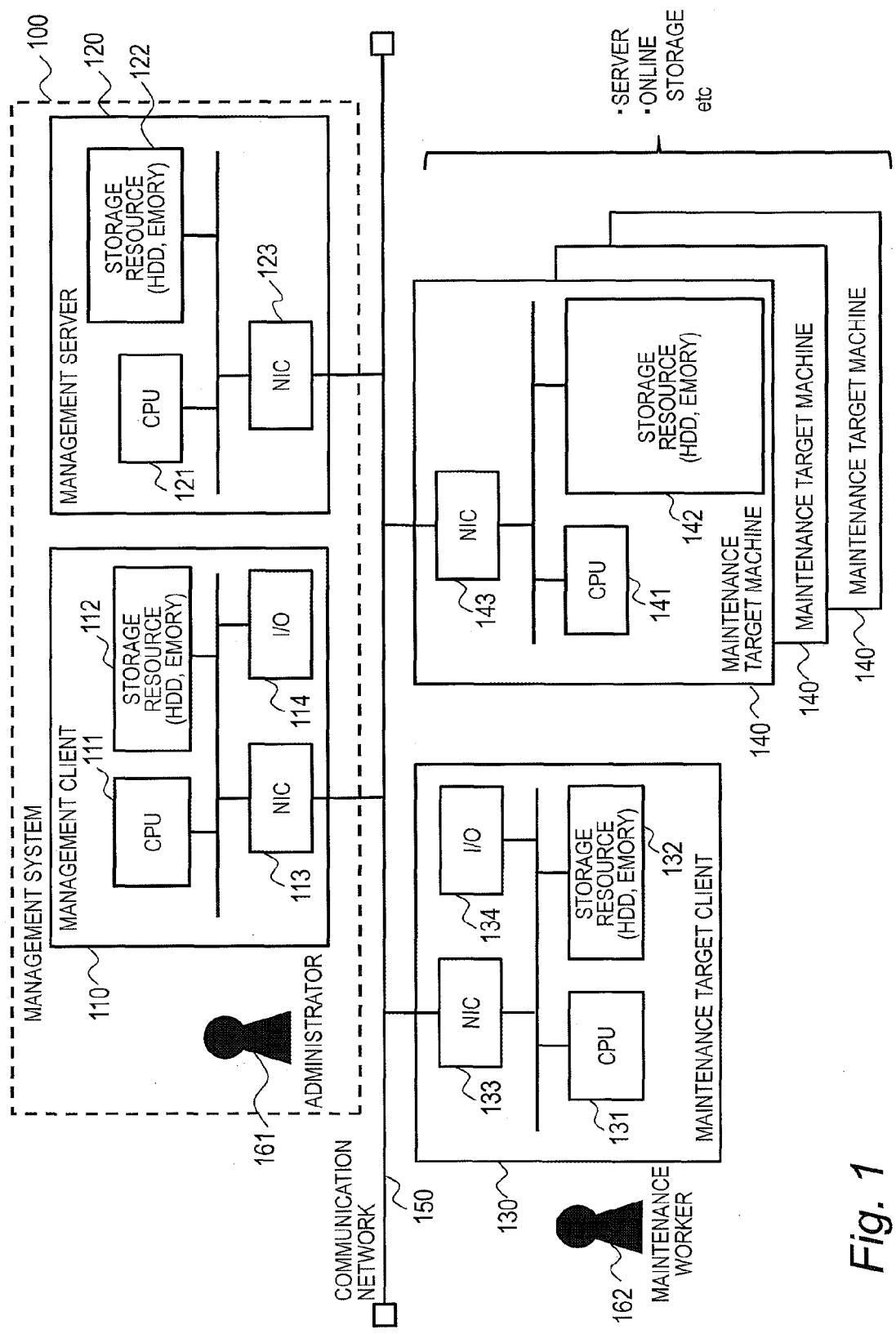
FIG. 1 is a block diagram illustrating a configuration of an overall information system according to an embodiment of this invention.

Now, a description is given of an embodiment of this invention with reference to the attached drawings.

In the following description, although pieces of information of this invention are described by using such expressions as "aaa table", "aaa list", "aaa DB", and "aaa queue" in some cases, those pieces of information may be expressed by in other forms than such data structures as a table, a list, a DB, a queue, and the like. Therefore, "aaa table", "aaa list", "aaa DB", "aaa queue", and the like are also referred to as "aaa information" in order to show that those pieces of information are independent of their data structures.

In addition, although such expressions as "identification information", "identifier", "name", "ID" are used in some cases in order to describe details of each piece of information, those expressions are interchangeable. In the following description, although a description is given by using "program" (including a program module or the like constructing the program) as a subject in some cases, the program is executed by a processor to perform defined processing while using a memory and a communication port (communication control device). Therefore, "program" described as a subject in the description of processing can be replaced by "processor". Further, processing disclosed while a program is used as a subject may also be interpreted as processing performed by a computer such as a management server or an information processing apparatus. Further, a part or all of processing executed by a processor in accordance with a program may also be implemented by dedicated hardware.

Further, various programs may also be installed onto each computer by a program distribution server or a computer-readable storage medium.

It should be noted that the management server includes an input/output device. Examples of the input/output device conceivably include a display, a keyboard, and a pointer device, but the input/output device may also be devices other than those devices. Further, a serial interface or an Ethernet interface may be used as a substitute for the input/output device. To be specific, an input and display of the input/output device may also be substituted by the following mode. Specifically, a computer for display including a display, a keyboard, or a pointer device is connected to the above-mentioned interface, and then, the management server transmits information for display to the computer for display and the computer for display performs display based on the information for display, or the management server receives information for input transmitted from the computer for display.

A set of at least one computer for managing an information processing system and displaying information for display of the invention of this application is hereinafter also referred to as "management system". In a case where the management server displays the information for display, the management server is the management system. Further, a combination of the management server and the computer for display is also the management system. Further, processing equivalent to that of the management server may also be implemented by a plurality of computers in order to speed up management processing and achieve a higher reliability, and in this case, the plurality of computers (including the computer for display in a case where the computer for display performs display) are the management system.

FIG. 1 is a block diagram illustrating a configuration of an overall information system according to the embodiment of this invention.

The information system according to this embodiment includes a management system 100, a maintenance target client 130, and at least one maintenance target machine 140. The management system 100 includes a management server 120 to be operated by an administrator 161 and a management client 110, which is a terminal to be used by the administrator 161 in order to operate the management server 120. The maintenance target client 130 is a terminal to be used by a maintenance worker 162 in order to operate the maintenance target machine 140. Those components are coupled to one another via a communication network 150.

The management client 110 is a computer including a central processing unit (CPU) 111, a storage resource 112, a network interface card (NIC) 113, and an input/output (I/O) 114.

The CPU 111 is a processor for executing a program stored in the storage resource 112, to thereby implement various functions. Examples of those various functions include a function of providing a user interface to be used by the administrator 161 in order to operate the management server 120 and a function of controlling the management server 120 in response to an instruction given by the administrator 161.

The storage resource 112 is implemented by an arbitrary storage device. For example, the storage resource 112 is implemented by a volatile storage device such as a dynamic random access memory (DRAM), a non-volatile storage device such as a hard disk drive (HDD), or a combination of those storage devices. In the storage resource 112, the program to be executed by the CPU 111, data to be referred to, and the like are stored.

The NIC 113 is an interface for connecting the management client 110 to the communication network 150. The I/O 114 includes an output apparatus for outputting information to the administrator 161 (for example, an image display apparatus) and an input apparatus for receiving an input of information from a user (for example, a keyboard and a pointer device).

The management server 120 is a computer including a CPU 121, a storage resource 122, and an NIC 123. The CPU 121 is a processor for executing a program stored in the storage resource 122, to thereby implement a function of, for example, centrally managing the at least one maintenance target machine 140. The storage resource 122 is implemented by an arbitrary storage device as in the case of the storage resource 112. The program and data stored in the storage resource 112 are described later with reference to FIG. 6 and other drawings. The NIC 123 is an interface for connecting the management server 120 to the communication network 150.

The maintenance target client 130 is a computer including a CPU 131, a storage resource 132, an NIC 133, and an I/O 134.

The CPU 131 is a processor for executing a program stored in the storage resource 132, to thereby implement various functions. Examples of those various functions include a function of providing a user interface to be used by the maintenance worker 162 in order to execute a maintenance operation on the maintenance target machine 140 and a function of controlling the maintenance target machine 140 in response to an instruction given by the maintenance worker 162.

The storage resource 132 can be implemented by an arbitrary storage device as in the case of the storage resource 112. The storage resource 132 stores the program to be executed by the CPU 131, data to be referred to, and the like.

The NIC 133 is an interface for connecting the maintenance target client 130 to the communication network 150. The I/O 134 may include an input apparatus and an output apparatus similar to those of the I/O 114.

Each of the maintenance target machines 140 is an information processing apparatus of an arbitrary kind, which is, for example, a server or an online storage apparatus. The maintenance target machines 140 each at least include a CPU 141, a storage resource 142, and an NIC 143. The CPU 141 is a processor for executing a program stored in the storage resource 142, to thereby implement a function of, for example, the maintenance target machine 140 (such as a function as a server in a case where the maintenance target machine 140 is the server). The storage resource 142 is implemented by an arbitrary storage device as in the case of the storage resource 112. The program and data stored in the storage resource 142 are described later with reference to FIG. 7 and other drawings. The NIC 143 is an interface for connecting the maintenance target machine 140 to the communication network 150.

Figure 2:
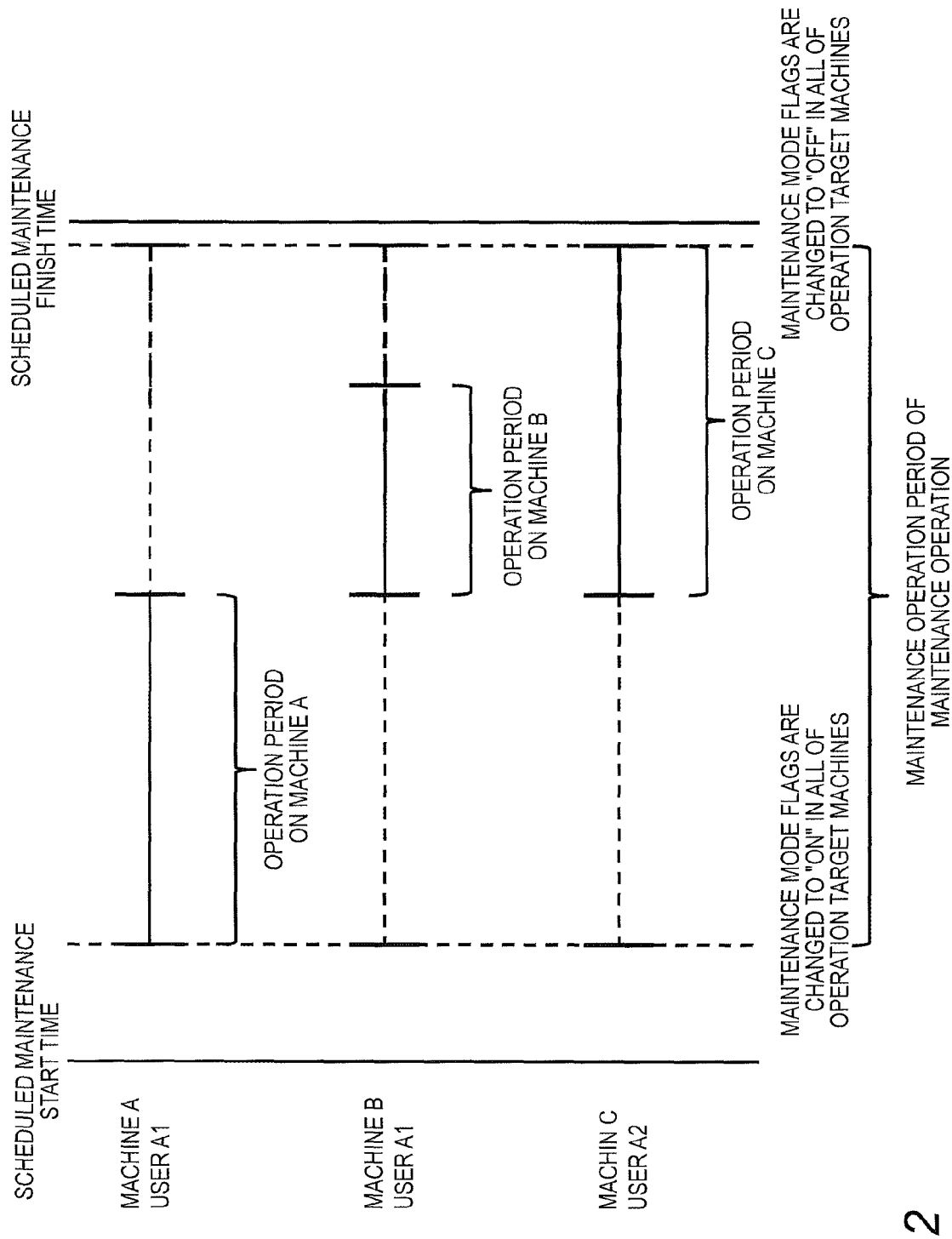
FIG. 2 is an explanatory diagram of a period of a maintenance operation executed in the information system according to the embodiment of this invention.

FIG. 2 is an explanatory diagram of a period of the maintenance operation executed in the information system according to the embodiment of this invention.

One maintenance operation may be executed on only one maintenance target machine 140, but in many cases, one maintenance operation is concurrently executed on a plurality of maintenance target machines 140. There is a dependency relationship in the operation that is concurrently executed on the plurality of maintenance target machines 140. (In other words, an operation executed on one maintenance target machine 140 may cause an error or other such events in another maintenance target machine 140.) Accordingly, a time point at which one maintenance operation is started first in any one of the plurality of maintenance target machines 140 that are targets of the maintenance operation is treated as a maintenance start time relating to the one maintenance operation, and at the maintenance start time, a maintenance mode flag is set to "ON" in all of the plurality of maintenance target machines 140. In addition, a time point at which the one maintenance operation is finished in all of the maintenance target machines 140 that are the targets of the one maintenance operation is treated as a maintenance finish time, and at the maintenance finish time, the maintenance mode flag is set to "OFF" in all of the maintenance target machines 140. As used herein, the maintenance mode flag refers to information indicating whether or not the maintenance operation is in execution on each of the maintenance target machines 140. The maintenance mode flag is stored in each of the maintenance target machines 140.

It should be noted that the maintenance operation is determined to be started when an account for maintenance operation logs in to the maintenance target machine 140, and the maintenance operation is determined to be finished when the account for maintenance operation logs out from the maintenance target machine 140.

In the example of FIG. 2, one maintenance operation is concurrently executed on three maintenance target machines 140 (specifically, a machine A used by a user A1, a machine B used by the user A1, and a machine C used by a user A2). A scheduled maintenance start time and a scheduled maintenance finish time are a start time point and a finish time point, respectively, that are scheduled in the maintenance operation. In this example, the maintenance operation on the machine A is started first at a time point later than the scheduled maintenance start time, and is finished before the scheduled maintenance finish time. The maintenance operations on the machine B and the machine C are started around the time when the maintenance operation on the machine A is finished. Then, the maintenance operation on the machine B is finished earlier, and after that, the maintenance operation on the machine C is finished before the scheduled maintenance finish time.

In this example, the maintenance mode flags are changed to "ON" in all of the three maintenance target machines 140 when the maintenance operation on the machine A is started, and the maintenance mode flags are changed to "OFF" in all of the three maintenance target machines 140 when the maintenance operation on the machine C is finished. In regard to a given maintenance operation, a period in which the management server 120 determines that the given maintenance operation is in execution, in other words, a period from when the maintenance mode flag of the maintenance target machine 140 is changed to "ON" to when the maintenance mode flag thereof is changed to "OFF" is hereinafter also referred to as "maintenance operation period". Meanwhile, a period from the scheduled maintenance start time to the scheduled maintenance finish time is hereinafter also referred to as "scheduled maintenance operation period".

On the maintenance target machine 140, when an error or the like is detected during execution of a normal operation (in other words, an operation not as the maintenance operation but as, for example, the server or the online storage), an event for notifying of the error or the like is transmitted to the management server 120. The management server 120 that has received the event can execute an action that is determined in advance in association with the received event. As an example of the action, the management server 120 records the received event and notifies the administrator 161 of the event. When the error the administrator 161 is notified of is caused by, for example, a failure that has occurred in the maintenance target machine 140, the above-mentioned action enables the administrator 161 to quickly take such a measure as a failure recovery.

On the other hand, when the maintenance operation is executed on the maintenance target machine 140, in general, many errors or the like due to the maintenance operation occur, and an event for notifying of those errors or the like is transmitted to the management server 120. However, in general, it is not necessary in many cases to take a measure similar to the one taken during a normal operation against the errors caused during the maintenance operation. It is therefore desired that the management server 120 determine whether or not the received event is caused by the maintenance operation and determine whether or not to execute predetermined processing depending on this determination.

In Japanese Patent Application Laid-open No. 2006-318036 described above as a background art of this invention, it is determined whether or not the received event is caused by the maintenance operation based only on the scheduled maintenance operation period. However, as illustrated in FIG. 2, even when the scheduled maintenance start time and the scheduled maintenance finish time are determined in advance, a start time and end time of an actual maintenance operation period do not necessarily match their scheduled maintenance start time and scheduled maintenance end time, respectively.

For example, even when the scheduled maintenance start time arrives, the maintenance operation cannot be started in a case where a normal operation is not finished, and hence an actual start of the maintenance operation is delayed. When all events that have occurred after the scheduled maintenance start time are determined as the ones caused by the maintenance operation in such case, the result is that the administrator 161 fails to detect an event that has occurred during a normal operation and misses an opportunity to execute a necessary measure such as a failure recovery. The same holds true for a case where all the actual maintenance operations are finished before the scheduled maintenance finish time.

In order to avoid such failure to detect the event, the management server 120 according to this embodiment determines whether or not the received event is caused by the maintenance operation based not only on the scheduled maintenance operation period but also on a result of detection of a login and logout for the maintenance operation (in other words, by the account for maintenance operation).

Figure 3:
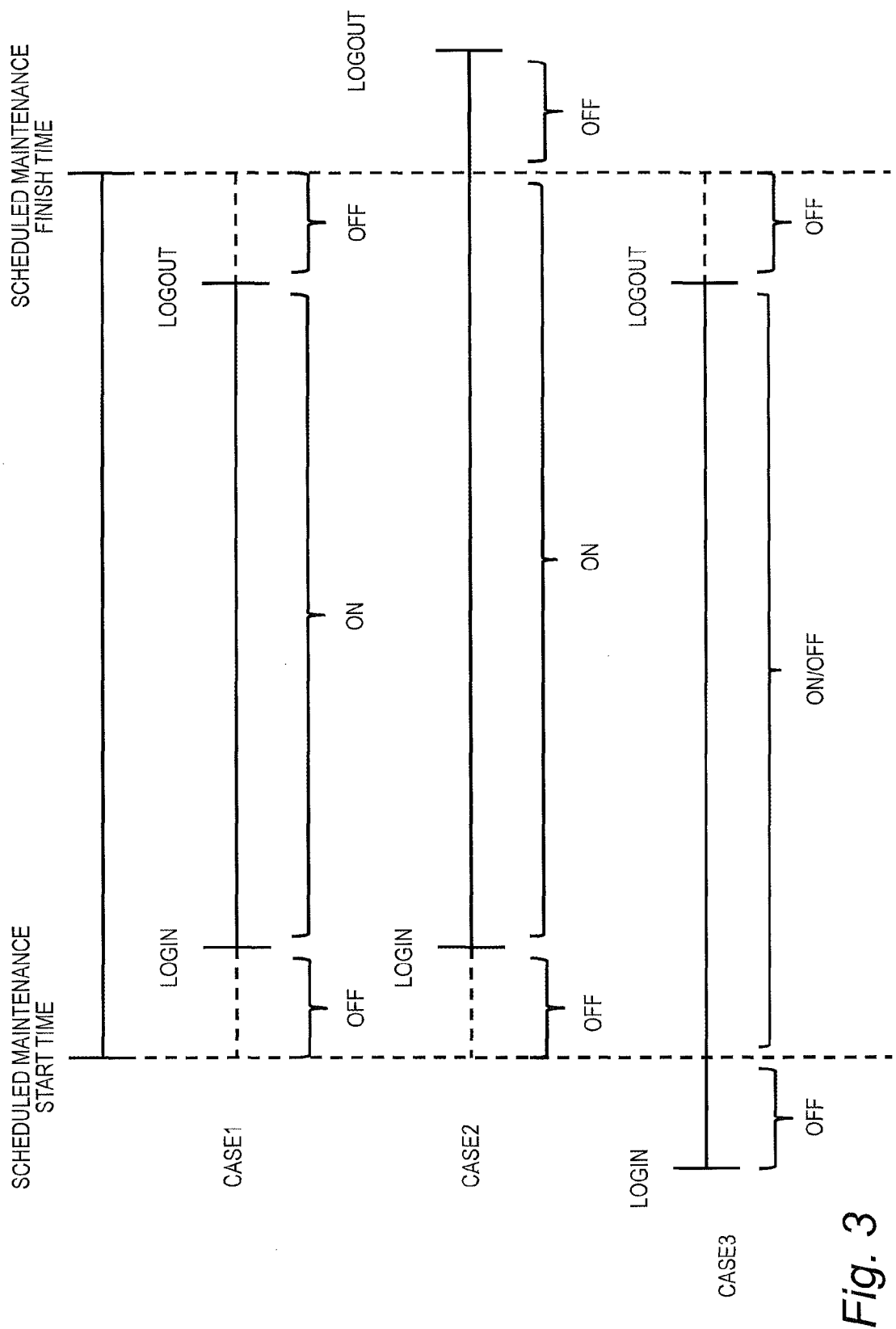
FIG. 3 is an explanatory diagram of Case 1 to Case 3 of the maintenance operation according to the embodiment of this invention.
Figure 4:
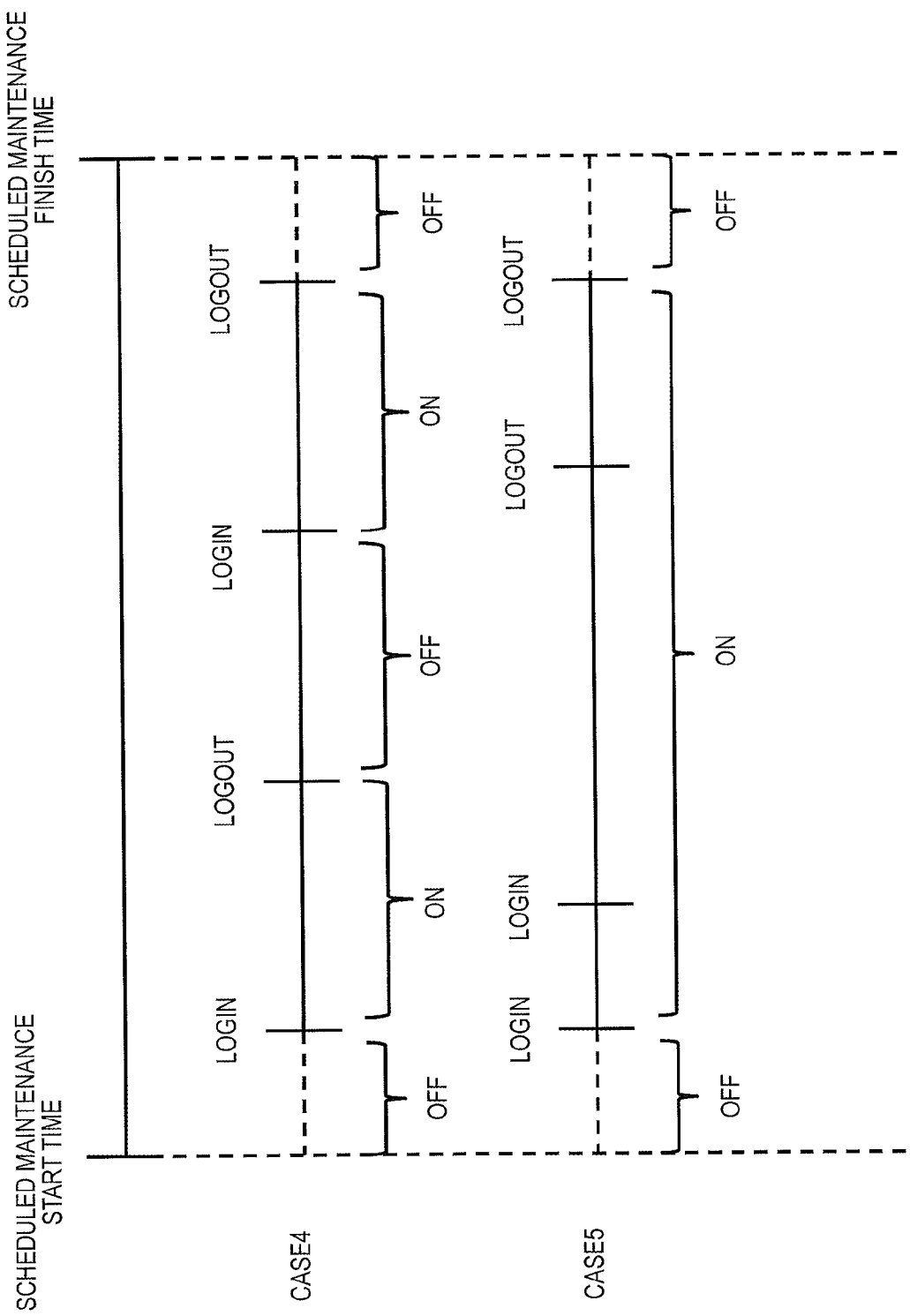
FIG. 4 is an explanatory diagram of Case 4 and Case 5 of the maintenance operation according to the embodiment of this invention.
Figure 5:
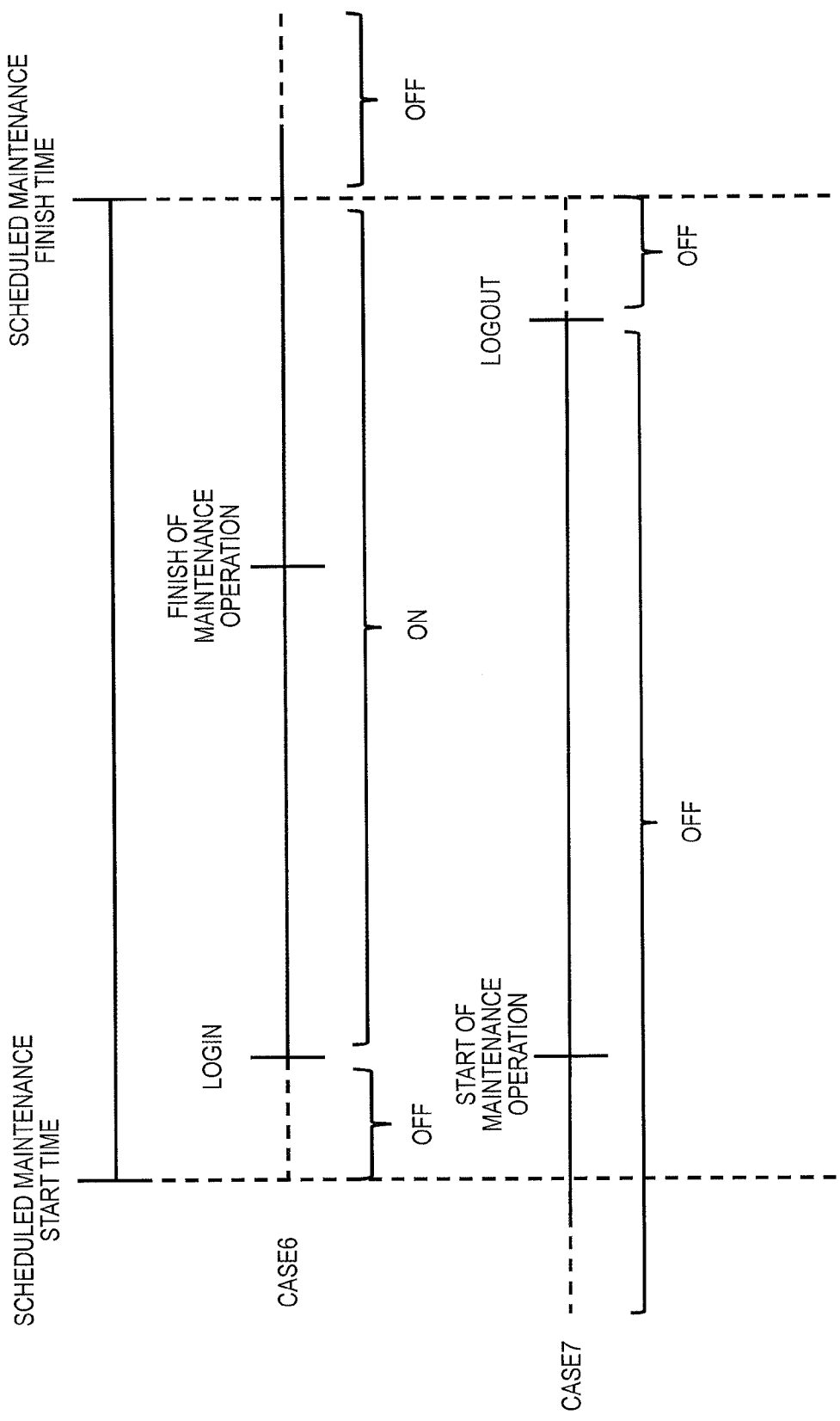
FIG. 5 is an explanatory diagram of Case 6 and Case 7 of the maintenance operation according to the embodiment of this invention.

A description is given with reference to FIGS. 3 to 5 of Case 1 to Case 7, which are typical examples of a relation between the scheduled maintenance start time and scheduled maintenance finish time and the login and logout.

FIG. 3 is an explanatory diagram of Case 1 to Case 3 of the maintenance operation according to the embodiment of this invention.

Case 1 is a case where the login is performed (in other words, the actual maintenance operation is started) after the scheduled maintenance start time and the logout is performed (in other words, the actual maintenance operation is finished) before the scheduled maintenance finish time. This is the most desirable (normal) case. In this case, the maintenance mode flag is set to "ON" only during a period from the login to logout, and the maintenance mode flag is set to "OFF" during other periods.

It should be noted that indications of the login and logout for each maintenance target machine 140 as illustrated in FIG. 2 are not shown in FIG. 3, but when there are a plurality of maintenance target machines 140 associated with one maintenance operation, the login and logout illustrated in FIG. 3 correspond to the first login and last logout on the plurality of maintenance target machines 140, respectively. For example, the login of Case 1 corresponds to the login to the machine A of FIG. 2 and the logout of Case 1 corresponds to the logout from the machine C of FIG. 2. The same holds true for other cases illustrated in FIGS. 3 to 5.

Case 2 is a case where the login is performed after the scheduled maintenance start time, but the logout is performed after the scheduled maintenance finish time because a progress of the maintenance operation is delayed. In this case, the maintenance mode flag is set to "ON" only during a period from the login to the scheduled maintenance finish time, and the maintenance mode flag is set to "OFF" during other periods. In other words, after the scheduled maintenance finish time, even when the logout is not performed (in other words, the actual maintenance operation is still in execution), it is determined that the maintenance operation is not in execution, and the maintenance mode flag is set to "OFF". In addition, in order to cause the management server 120 to detect the logout after the scheduled maintenance finish time, the management server 120 is notified of logout information having "Warning" assigned thereto as its level of importance.

Case 3 is a case where the login is performed before the scheduled maintenance start time because the maintenance operation is started ahead of schedule, and the logout is performed after the scheduled maintenance start time and before the scheduled maintenance finish time. In this case, even after the login is performed, the maintenance mode flag is set to "OFF" during a period before the scheduled maintenance start time. In other words, during a period from when the login is performed to the scheduled maintenance start time, it is determined that the maintenance operation is not in execution even when the maintenance operation is actually in execution.

During a period from the scheduled maintenance start time to the logout, the maintenance mode flag is set to one of "ON" and "OFF" in accordance with a policy (to be described later) determined in advance. After the logout is performed, the maintenance mode flag is set to "OFF".

In Case 3, the actual maintenance operation is started during the period in which the maintenance mode flag is "OFF", and hence the management server 120 is notified of the error caused by the maintenance operation as a normal event. Then, after the maintenance mode flag is changed to "ON" at the scheduled maintenance start time, the management server 120 is notified of the error caused by the maintenance operation as a maintenance event. An advantage of setting the maintenance mode flag to "OFF" even during the period from the scheduled maintenance start time to the logout is that it is possible to prevent the confusion of the administrator 161 due to a sudden stop of notification of the errors that the administrator 161 has been notified of as the normal events. It should be noted that the normal event and the maintenance event are described later with reference to FIG. 14A, FIG. 14B, and other drawings.

FIG. 4 is an explanatory diagram of Case 4 and Case 5 of the maintenance operation according to the embodiment of this invention.

Case 4 is a case where the login and logout are repeatedly performed during a period from the scheduled maintenance start time to the scheduled maintenance finish time. Case 4 may be, for example, a case where the maintenance worker 162 logs out by mistake during the maintenance operation and logs in again after that. In such case, the logins performed for second and subsequent times are detected as well and the maintenance mode flag is set to "ON" at each detection.

Specifically, for example, when a first login is performed after the scheduled maintenance start time, the maintenance mode flag is changed from "OFF" to "ON", and after that, when a first logout is performed before the scheduled maintenance finish time, the maintenance mode flag is changed to "OFF". Further after that, when a second login is performed before the scheduled maintenance finish time, the maintenance mode flag is changed to "ON" again, and after that, when a second logout is performed before the scheduled maintenance finish time, the maintenance mode flag is changed to "OFF".

Case 5 is a case where the logins are repeatedly performed during the period from the scheduled maintenance start time to the scheduled maintenance finish time, and after that, the logouts associated with the respective logins are performed. Case 5 may be, for example, a case where the maintenance operation is executed via a plurality of maintenance target clients 130. In such case, a number of times for which the logins are performed is count, and the maintenance mode flag is set to "ON" until the logouts are performed for the same number of times as the count of logins.

Specifically, for example, in a case where the first login, the second login, the first logout, and the second logout are performed in order during the period from the scheduled maintenance start time to the scheduled maintenance finish time, the maintenance mode flag is changed from "OFF" to "ON" when the first login is performed, and the changed value is maintained until the flag is changed to "OFF" at the second logout.

FIG. 5 is an explanatory diagram of Case 6 and Case 7 of the maintenance operation according to the embodiment of this invention.

Case 6 is a case where the maintenance worker 162 has not performed the logout, which is supposed to be performed by the maintenance worker 162 in normal cases. Specifically, for example, the login is performed after the scheduled maintenance start time, and after that, although the maintenance operation is actually finished before the scheduled maintenance finish time, the maintenance target machine 140 is left as it is while the maintenance worker 162 forgets to log out. In such case, the maintenance mode flag is maintained to be "ON" even after the actual maintenance operation is finished because the logout is not detected, but the maintenance mode flag is changed to "OFF" when the scheduled maintenance finish time arrives.

Case 7 is a case where a detected count of logins is less than a count of logouts. This case corresponds to, for example, a case where after the login to the maintenance target machine 140 is performed, a snapshot of a virtual machine under a state in which the account for maintenance operation does not log in to the maintenance target machine 140 is read on the management server 120. In such case, the start of the maintenance operation by the login cannot be detected, and hence the maintenance mode flag is maintained to be "OFF" even after the maintenance operation is started, and "OFF" is also set as the maintenance mode flag after the logout is detected.

Figure 6:
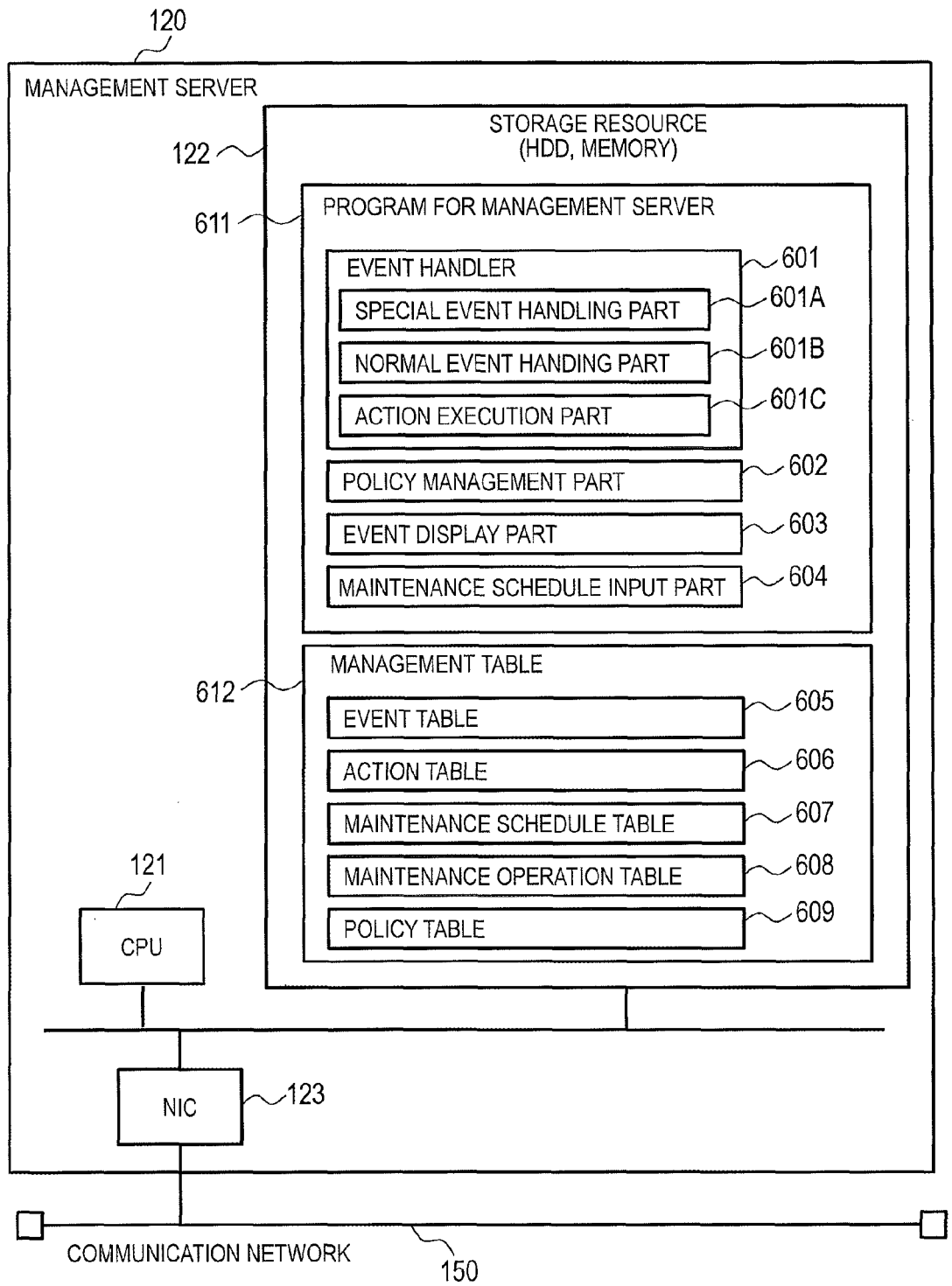
FIG. 6 is a block diagram illustrating a configuration of a management server according to the embodiment of this invention.

Referring to FIG. 6 and subsequent drawings, a specific description is given of information stored in the management server 120 and each of the maintenance target machines 140 and processing executed by the management server 120 and each of the maintenance target machines 140 in order to execute the control of the maintenance mode flag as described above.

FIG. 6 is a block diagram illustrating a configuration of the management server 120 according to the embodiment of this invention.

The storage resource 122 of the management server 120 stores a program for management server 611 and a management table 612.

The program for management server 611 includes an event handler 601, a policy management part 602, an event display part 603, and a maintenance schedule input part 604. Moreover, the event handler 601 includes a special event handling part 601A, a normal event handing part 601B, and an action execution part 601C. Those parts are each a program module constructing a part of the program for management server 611 or the program for management server 611. In the following, a description may be given of pieces of processing executed by the program for management server 611 (specifically, for example, the event handler 601), but those pieces of processing are actually implemented by the CPU 121 using resources such as the storage resource 122 and the NIC 123 in accordance with the program for management server 611. Details of the pieces of processing executed by the CPU 121 are described later.

The management table 612 includes an event table 605, an action table 606, a maintenance schedule table 607, a maintenance operation table 608, and a policy table 609. Specific details of those tables are described later.

The management server 120 receives from the maintenance target machine 140 an event associated with an operation of the maintenance worker 162 on the maintenance target client 130 or a state of the maintenance target machine 140, and transmits the received event to the event handler 601. The special event handling part 601A receives a special event, the normal event handing part 601B receives the normal event, and the action execution part 601C executes a predetermined action when the received event satisfies predetermined conditions.

As used herein, the normal event refers to an event having "Normal" or "Maintenance" as an event type, and the special event refers to an event having any one of "Login", "Logout", "Logged-in", and "Not Logout" as the event type. Specific details of each event are described later with reference to see FIGS. 14B to 14D.

Depending on the received event, the event handler 601 updates the maintenance operation table 608, or stores the received event in the event table 605 and executes an action matching conditions. To describe in detail, the special event handling part 601A executes processing relating to the special event (in other words, an event other than the normal event), the normal event handing part 601B executes processing relating to the normal event, and the action execution part 601C executes processing relating to actions associated with those events.

Figure 7:
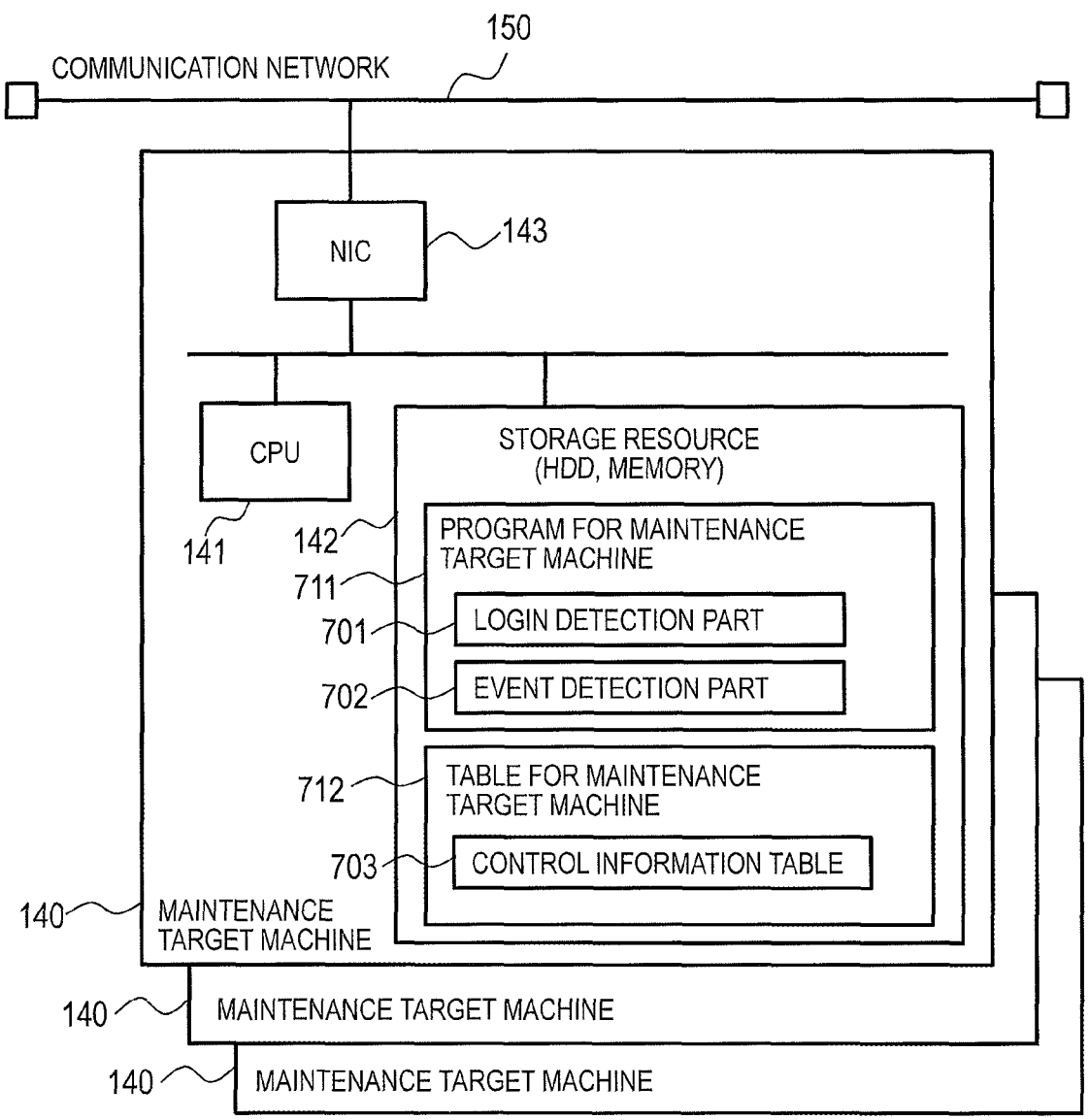
FIG. 7 is a block diagram illustrating a configuration of each maintenance target machine according to the embodiment of this invention.

FIG. 7 is a block diagram illustrating a configuration of each maintenance target machine 140 according to the embodiment of this invention.

The storage resource 142 of each maintenance target machine 140 stores a program for maintenance target machine 711 and a table for maintenance target machine 712.

The program for maintenance target machine 711 includes a login detection part 701 and an event detection part 702. Those parts are each a program module constructing a part of the program for maintenance target machine 711 or the program for maintenance target machine 711. In the following, a description may be given of pieces of processing executed by the program for maintenance target machine 711 (specifically, for example, the login detection part 701), but those pieces of processing are actually implemented by the CPU 141 using resources such as the storage resource 142 and the NIC 143 in accordance with the program for maintenance target machine 711. Details of the pieces of processing executed by the CPU 141 are described later.

It should be noted that the storage resource 142 of each maintenance target machine 140 further stores an application program for implementing a function of each maintenance target machine 140 (for example, a function as a server when the maintenance target machine 140 is the server or a function as an online storage when the maintenance target machine 140 is the online storage), and the application program is executed by the CPU 141. Such application program may be the same as the one that has been hitherto used, and hence the illustration and detailed description thereof are therefore omitted.

The table for maintenance target machine 712 includes a control information table 703. Details of the control information table 703 are described later.

When the login detection part 701 or the event detection part 702 has detected that any one of the following event issuance conditions (1) to (4) is satisfied, the maintenance target machine 140 transmits the event to the management server 120.

(1) The event detection part 702 has detected that an event issuance condition, such as reception of an event issuance command or detection of an error in the maintenance target machine 140, is satisfied.

For example, the administrator 161 who desires to monitor whether an application operates normally in any one of the maintenance target machines 140 under the Windows environment (hereinafter referred to as maintenance target machine A) sets, for the program for maintenance target machine 711 of the maintenance target machine A, such an issuance condition that "the event is output when an error message is output in an application log of an event log of the maintenance target machine A." The event detection part 702 of the program for maintenance target machine 711 of the maintenance target machine A monitors the maintenance target machine A at all times, and transmits the event to the management server 120 when the error message is output in the application log of the event log of the maintenance target machine A.

(2) The login detection part 701 has detected the login of the account for maintenance operation.

(3) The login detection part 701 has detected the logout of the account for maintenance operation.

(4) The special event handling part 601A has detected that the maintenance operation has not been finished by the scheduled maintenance finish time.

In order to detect the login and logout of the account for maintenance operation, the login detection part 701 monitors a signal (for example, SIGTERM) of an operating system (OS) of the maintenance target machine 140 at all times. When detecting a login signal, which is issued at the time of the login, the login detection part 701 transmits the event indicating the login to the management server 120. When detecting a logout signal, which is issued at the time of the logout, the login detection part 701 transmits the event indicating the logout to the management server 120.

It should be noted that each of the maintenance target machines 140 stores, as terminal information, its own maintenance mode flag in the control information table 703 without fail. In addition, when the maintenance mode flag is "ON", each of the maintenance target machines 140 further stores a maintenance operation name and a maintenance operation number in the control information table 703. Based on the event detected by the login detection part 701 or the event detection part 702 and the maintenance mode flag, each of the maintenance target machines 140 assigns information illustrated in any one of FIGS. 14B to 14D to the event and transmits the resultant event to the management server 120. The maintenance mode flag is updated with the event from the management server 120.

FIG. 8 is an explanatory diagram of the event table 605 stored in the management server 120 according to the embodiment of this invention.

The event table 605 stores information on the event transmitted to the management server 120 by the maintenance target machine 140. Specifically, the event table 605 includes an event ID 801, a message 802, a level of importance 803, a transmission source 804, an action state 805, an event type 806, and an event occurrence time 807.

The event ID 801 is information identifying a message of each event received from the maintenance target machine 140 by the management server 120. The message 802 is the message of each event.

The level of importance 803 is information indicating a level of importance of the message of each event, and is, for example, one of "Error", "Warning", and "Information", which are stated in descending order of the level of importance. The transmission source 804 is information identifying the maintenance target machine 140 that has transmitted each event. The action state 805 is information indicating whether or not there is an action associated with each event, and also indicating, when there is an action associated with the event, an execution state of the action.

The event type 806 is information identifying a type of each event. Specifically, stored as the event type 806 are, for example, "Normal" identifying the normal event, "Maintenance" identifying an event associated with the maintenance operation, "Login" identifying the special event that indicates the start of the maintenance operation, or "Logout" identifying the special event that indicates the finish of the maintenance operation. The event occurrence time 807 is information indicating an occurrence time of each event.

FIG. 9 is an explanatory diagram of the action table 606 stored in the management server 120 according to the embodiment of this invention.

The action table 606 stores information on the action associated with the event. Specifically, the action table 606 includes an action name 901, a priority 902, an action condition (attribute name) 903, an action condition (attribute value) 904, an action condition (condition) 905, an execution host 906, an execution user 907, and an action 908.

The action name 901 is a name uniquely identifying each action. The priority 902 is information indicating a priority of each action.

The action condition (attribute name) 903 to the action condition (condition) 905 indicate conditions for executing the action. The execution host 906, the execution user 907, and the action 908 indicate the host that executes the action when the conditions are satisfied, a user who executes the action, and details of the action, respectively. Specifically, when the value of an attribute specified in the action condition (attribute name) 903 and the value of an attribute specified in the action condition (attribute value) 904 of the event received by the management server 120 satisfy the condition specified in the action condition (condition) 905, the host specified in the execution host 906 and an account of the user specified in the execution user 907 execute the action specified in the action 908.

For example, when the action condition (attribute name) 903, the action condition (attribute value) 904, and the action condition (condition) 905 associated with the action name 901 "recovery" are "Event ID, Level of Importance", "Event 080, Error", and "Match, Equal To or More", respectively, and the execution host 906, the execution user 907, and the action 908 associated with those conditions are "Machine A", "User A", and "recovery.bat", respectively, it is determined whether or not a condition that the event ID 801 of the received event matches "Event 080" and the level of importance 803 of the event is equal to or more than "Error" is satisfied. When this condition is satisfied, "recovery.bat" is executed by the user A and the machine A.

It should be noted that when one event satisfies a plurality of conditions, an action associated with one that has the highest priority 902 of those conditions is executed.

FIG. 10 is an explanatory diagram of the maintenance schedule table 607 stored in the management server 120 according to the embodiment of this invention.

The maintenance schedule table 607 stores information on a schedule of the maintenance operation. Specifically, the maintenance schedule table 607 includes a scheduled maintenance start time 1001, a scheduled maintenance finish time 1002, and a maintenance operation name 1003. The maintenance operation name 1003 is a name uniquely identifying the maintenance operation, and a scheduled start time and scheduled finish time of the maintenance operation are stored as the scheduled maintenance start time 1001 and the scheduled maintenance finish time 1002, respectively. The scheduled maintenance start time 1001 and the scheduled maintenance finish time 1002 correspond to the scheduled maintenance start time and the scheduled maintenance finish time, respectively, which are illustrated in FIGS. 2 to 5.

FIG. 11 is an explanatory diagram of the maintenance operation table 608 stored in the management server 120 according to the embodiment of this invention.

The maintenance operation table 608 stores information on the maintenance operation registered in the maintenance schedule table 607. Specifically, the maintenance operation table 608 includes an ID 1101, a maintenance operation name 1102, a maintenance operation number 1103, a maintenance target machine 1104, an account for maintenance operation 1105, an operation state 1106, and a login count 1107.

The ID 1101 is information identifying each row of the maintenance operation table 608. The maintenance operation table 608 includes a plurality of combinations of the maintenance operation name 1102, the maintenance operation number 1103, the maintenance target machine 1104, the account for maintenance operation 1105, the operation state 1106, and the login count 1107, and each of the combinations is uniquely identified by the ID 1101.

The maintenance operation name 1102 is information uniquely identifying each maintenance operation, and corresponds to the maintenance operation name 1003 of FIG. 10. The maintenance operation number 1103 is a number identifying each of the operations in a case where one maintenance operation identified by the maintenance operation name 1102 includes a plurality of operations. In the maintenance operation table 608, each combination of the maintenance operation name 1102 and the maintenance operation number 1103 is unique.

The maintenance target machine 1104 is information identifying the maintenance target machine 140 on which each operation identified by the combination of the maintenance operation name 1102 and the maintenance operation number 1103 is executed. The account for maintenance operation 1105 is an account used for the maintenance operation. The login of this account is detected as the start of the maintenance operation. The operation state 1106 is information indicating the state of the maintenance operation (for example, whether or not the maintenance operation is finished). The login count 1107 is information indicating an actual current login count of the account for maintenance operation, and its initial value is "0" in the example of FIG. 11.

Figure 12:
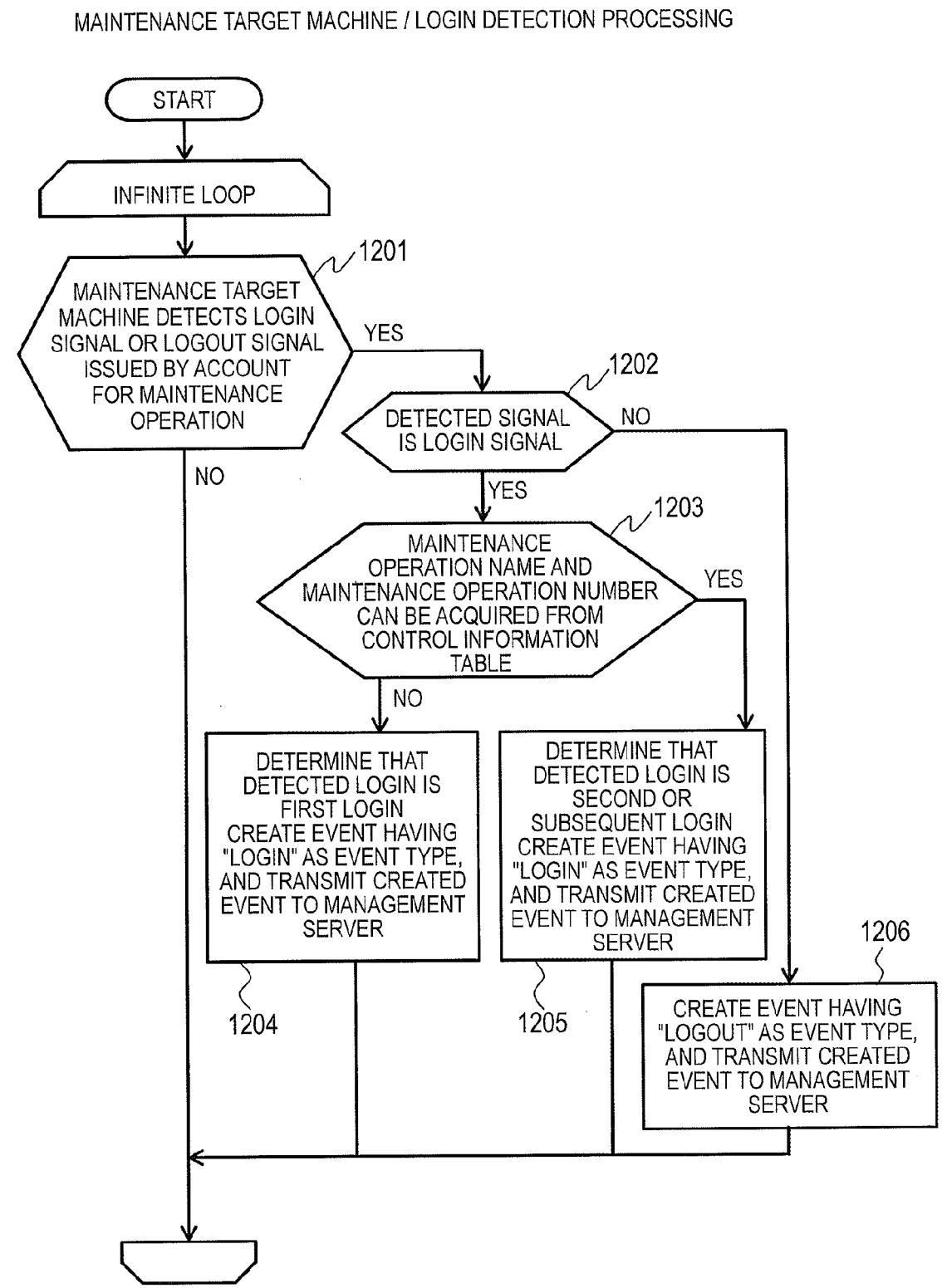
FIG. 12 is a flow chart of login detection processing executed by the maintenance target machine according to the embodiment of this invention.

FIG. 12 is a flow chart of login detection processing executed by the maintenance target machine 140 according to the embodiment of this invention.

The login detection processing is processing in which the maintenance target machine 140 detects the login or logout to transmit a login event or logout event to the management server 120.

When the login detection part 701 of the maintenance target machine 140 detects the login signal or logout signal issued by the account for maintenance operation (Step 1201), the login detection part 701 determines whether or not the detected signal is the login signal (Step 1202).

When the detected signal is the login signal, the login detection part 701 determines whether or not the maintenance operation name and the maintenance operation number are stored in the control information table 703 (Step 1203).

When the maintenance operation name and the maintenance operation number are not stored in the control information table 703, the login detection part 701 determines that the detected login is the first login, and acquires information on the first login from the maintenance target machine 140. The login detection part 701 then creates an event that includes the acquired information and has "Login" as the event type, and transmits the created event to the management server 120 (Step 1204).

When the maintenance operation name and the maintenance operation number are stored in the control information table 703, the login detection part 701 determines that the detected login is a second or subsequent login (for example, the second login in Case 5 of FIG. 4), and acquires the maintenance operation name and the maintenance operation number from the maintenance target machine 140. The login detection part 701 then creates an event that includes the acquired information and has "Login" as the event type, and transmits the created event to the management server 120 (Step 1205).

When the detected signal is the logout signal, the login detection part 701 acquires information on the logout from the maintenance target machine 140, and creates an event that includes the acquired information and has "Logout" as the event type, and transmits the created event to the management server 120 (Step 1206).

Details of the events created in Steps 1204 to 1206 are described later with reference to FIG. 14B. Each of the events transmitted in Steps 1204 to 1206 is received in event determination processing of the management server 120 as illustrated in FIG. 15).

The login detection part 701 repeatedly executes an infinite loop of Steps 1201 to 1206.

Figure 13:
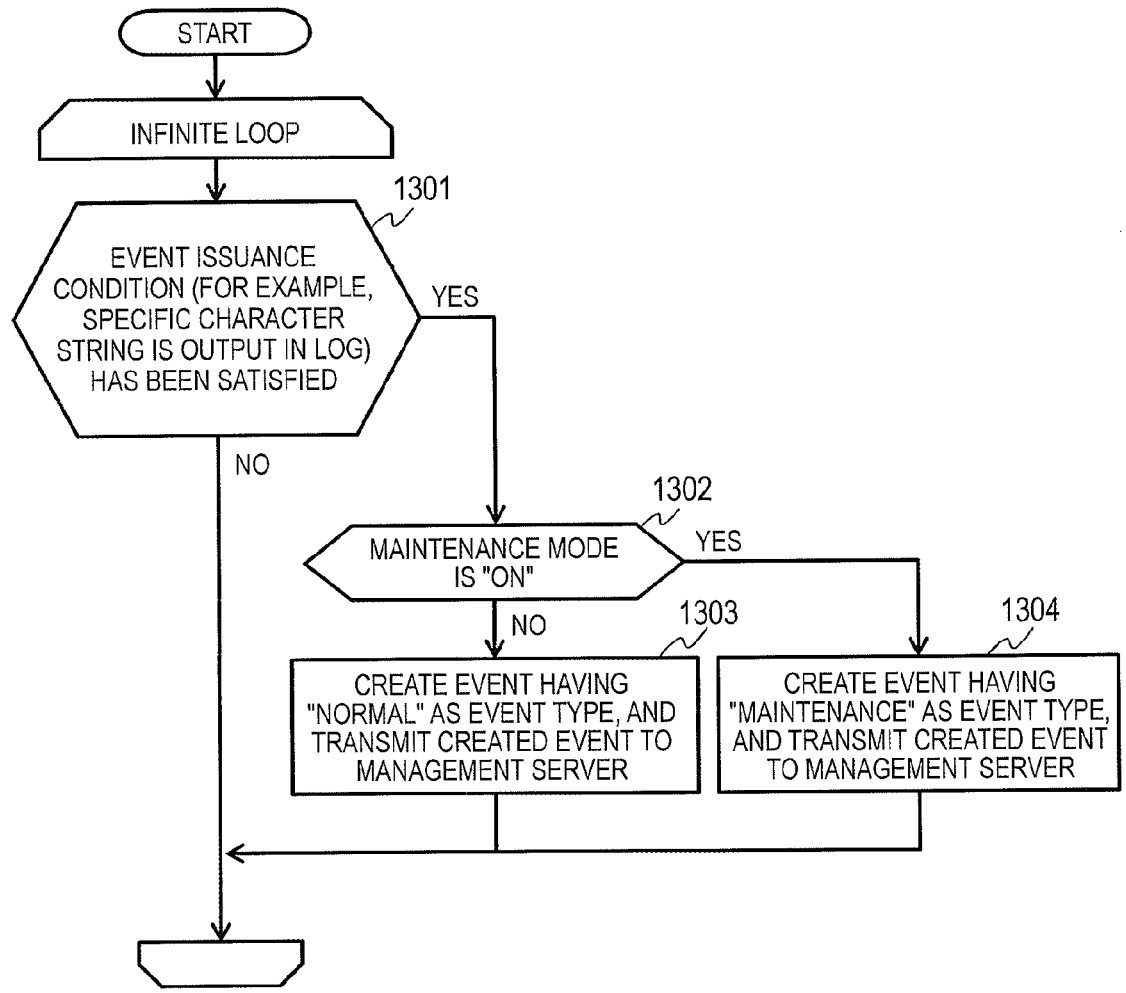
FIG. 13 is a flow chart of event detection processing executed by the maintenance target machine according to the embodiment of this invention.

FIG. 13 is a flow chart of event detection processing executed by the maintenance target machine 140 according to the embodiment of this invention.

The event detection processing is processing in which the maintenance target machine 140 detects that the event issuance condition has been satisfied and transmits the normal event or maintenance event.

The event detection part 702 of the maintenance target machine 140 determines whether or not the maintenance target machine 140 satisfies the event issuance condition (Step 1301). Specifically, when a condition determined in advance, such as a condition that a specific character string is output in a log, is satisfied, the event detection part 702 determines that the maintenance target machine 140 satisfies the event issuance condition.

When the event issuance condition is satisfied, the event detection part 702 determines whether or not the maintenance mode flag of the control information table 703 is "ON" (Step 1302).

When the maintenance mode flag is "OFF", the event to be issued is not an event occurring during the maintenance operation period, and hence the event detection part 702 acquires normal information from the maintenance target machine 140. The event detection part 702 then creates an event that includes the acquired information and has "Normal" as the event type, and transmits the created event to the management server 120 (Step 1303).

When the maintenance mode flag is "ON", the event to be issued is an event occurring during the maintenance operation period, and hence the event detection part 702 acquires information on the maintenance operation from the maintenance target machine 140. The event detection part 702 then creates an event that includes the acquired information and has "Maintenance" as the event type, and transmits the created event to the management server 120 (Step 1304).

It should be noted that when the maintenance mode flag is "ON", instead of transmitting the above-mentioned event, the event detection part 702 may also control the maintenance target machine 140 so that the maintenance target machine 140 does not transmit the event. With this, the traffic between the management server 120 and the maintenance target machine 140 is reduced, which eliminates the need for the management server 120 to handle the event caused by the maintenance operation.

Details of the events created in Steps 1303 and 1304 are described later with reference to FIG. 14B. Each of the events transmitted in Steps 1303 and 1304 is received in the event determination processing of the management server 120 as illustrated in FIG. 15.

FIG. 14A is an explanatory diagram of the event and control information transmitted and received between the maintenance target machine 140 and the management server 120 according to the embodiment of this invention.

Figure 14C:
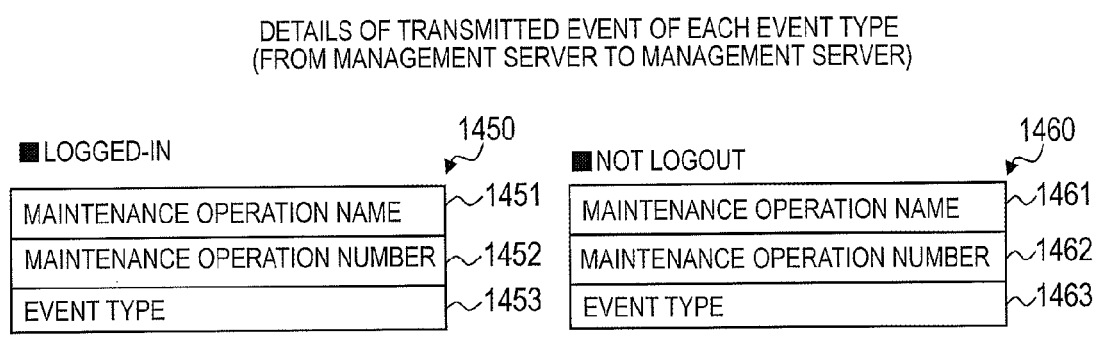
FIG. 14C is an explanatory diagram of details of the events transmitted within the management server according to the embodiment of this invention.
Figure 14D:
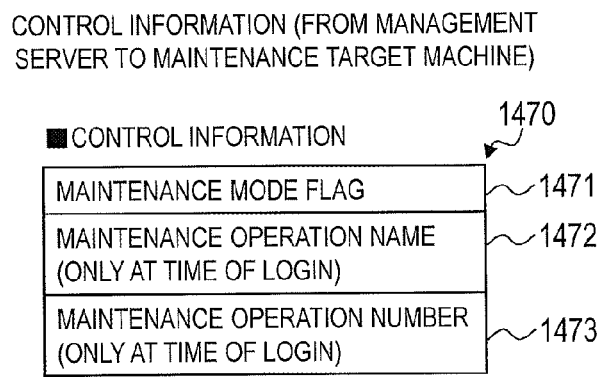
FIG. 14D is an explanatory diagram of details of the control information transmitted from the management server to the maintenance target machine according to the embodiment of this invention.
Figure 15:
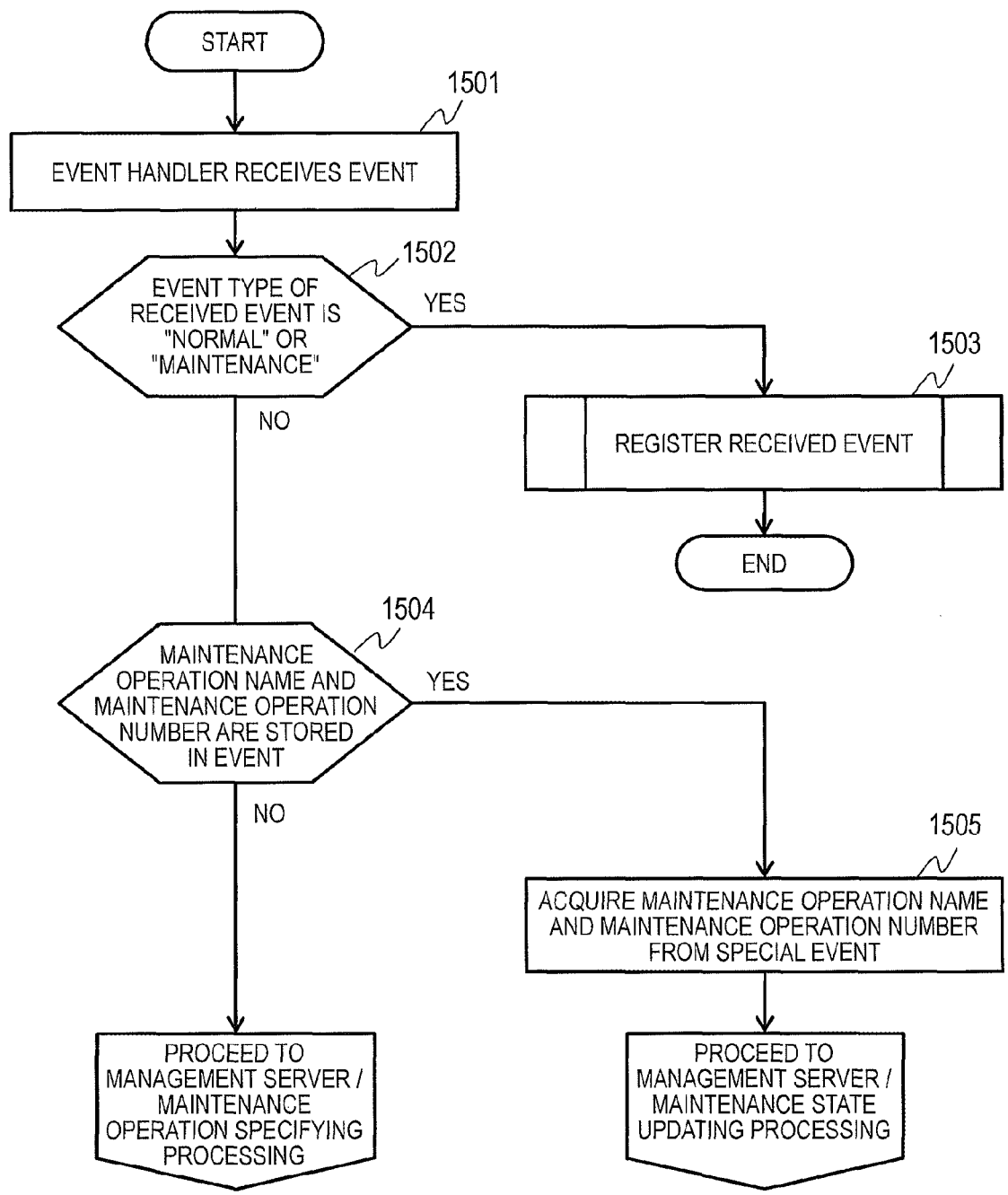
FIG. 15 is a flow chart of event determination processing executed by the management server according to the embodiment of this invention.

The maintenance target machine 140 transmits several types of events as illustrated in see FIG. 14B to the management server 120 depending on a predetermined condition. The management server 120 transmits other several types of events as illustrated in FIG. 14C within the management server 120 depending on a predetermined condition. The management server 120 further transmits the control information as illustrated in FIG. 14D to the maintenance target machine 140 depending on a predetermined condition.

FIG. 14B is an explanatory diagram of details of the events transmitted from the maintenance target machine 140 to the management server 120 according to the embodiment of this invention.

Transmitted from the maintenance target machine 140 to the management server 120 are a normal event 1400, a maintenance event 1410, a first login event 1420, a second or subsequent login event 1430, and a logout event 1440.

The normal event 1400 includes an event occurrence time 1401, an event ID 1402, a message 1403, a transmission source 1404, and an event type 1405. The event occurrence time 1401 is information indicating an occurrence time of the normal event 1400, and corresponds to the event occurrence time 807 shown in FIG. 8. The event ID 1402 is information identifying the message of the normal event 1400, and corresponds to the event ID 801 shown in FIG. 8. The message 1403 is the message of the normal event 1400, and corresponds to the message 802 shown in FIG. 8. The transmission source 1404 is information identifying the maintenance target machine 140 that has transmitted the normal event 1400, and corresponds to the transmission source 804 shown in FIG. 8. The event type 1405 is information indicating that the event in question is the normal event 1400, and corresponds to the event type 806 shown in FIG. 8.

The maintenance event 1410 includes an event occurrence time 1411, an event ID 1412, a message 1413, a transmission source 1414, and an event type 1415. Those pieces of information are the same as the event occurrence time 1401, the event ID 1402, the message 1403, the transmission source 1404, and the event type 1405 of the normal event 1400, respectively, except that each of those pieces of information is information on the maintenance event 1410 and the event type 1415 is information indicating that the event in question is the maintenance event 1410. It should be noted that the transmission source 1414 corresponds also to the maintenance target machine 1104 shown in FIG. 11.

The first login event 1420 includes a transmission source 1421, an account for maintenance operation 1422, and an event type 1423. The transmission source 1421 is information identifying the maintenance target machine 140 that has transmitted the first login event 1420, and corresponds to the transmission source 804 shown in FIG. 8 and the maintenance target machine 1104 shown in FIG. 11. The account for maintenance operation 1422 is the account for maintenance operation that has performed the detected login, and corresponds to the account for maintenance operation 1105 shown in FIG. 11. The event type 1423 is information indicating that the event in question is the first login event 1420, and corresponds to the event type 806 shown in FIG. 8.

The second or subsequent login event 1430 includes a maintenance operation name 1431, a maintenance operation number 1432, and an event type 1433. The maintenance operation name 1431 is information uniquely identifying the maintenance operation associated with the detected login, and corresponds to the maintenance operation name 1003 shown in FIG. 10 and the maintenance operation name 1102 shown in FIG. 11. The maintenance operation number 1432 is a number of one of the operations included in the maintenance operation, and corresponds to the maintenance operation number 1103 shown in FIG. 11. The event type 1433 is information indicating that the event in question is the second or subsequent login event 1430, and corresponds to the event type 806 shown in FIG. 8.

The logout event 1440 includes a maintenance operation name 1441, a maintenance operation number 1442, a transmission source 1443, an account for maintenance operation 1444, and an event type 1445. The maintenance operation name 1441 is information uniquely identifying the maintenance operation associated with the detected logout, and corresponds to the maintenance operation name 1003 shown in FIG. 10 and the maintenance operation name 1102 shown in FIG. 11. The maintenance operation number 1442 is a number of one of the operations included in the maintenance operation, and corresponds to the maintenance operation number 1103 shown in FIG. 11. The transmission source 1443 is information identifying the maintenance target machine 140 that has transmitted the logout event 1440, and corresponds to the transmission source 804 shown in FIG. 8 and the maintenance target machine 1104 shown in FIG. 11. The account for maintenance operation 1444 is the account for maintenance operation that has performed the detected logout, and corresponds to the account for maintenance operation 1105 shown in FIG. 11. The event type 1445 is information indicating that the event in question is the logout event 1440, and corresponds to the event type 806 shown in FIG. 8.

FIG. 14C is an explanatory diagram of details of the events transmitted within the management server 120 according to the embodiment of this invention.

Transmitted within the management server 120 are a logged-in event 1450 and a not-logout event 1460.

The logged-in event 1450 includes a maintenance operation name 1451, a maintenance operation number 1452, and an event type 1453. The maintenance operation name 1451 and the maintenance operation number 1452 are pieces of information identifying the maintenance operation associated with the login that is detected before the scheduled maintenance start time and the operation included in this maintenance operation, respectively. The event type 1453 is information indicating that the event in question is the logged-in event 1450.

The not-logout event 1460 includes a maintenance operation name 1461, a maintenance operation number 1462, and an event type 1463. The maintenance operation name 1461 and the maintenance operation number 1462 are pieces of information identifying the maintenance operation determined as still in execution at a time point when the scheduled maintenance finish time arrives and the operation included in this maintenance operation, respectively. The event type 1463 is information indicating that the event in question is the not-logout event 1460.

FIG. 14D is an explanatory diagram of details of the control information transmitted from the management server 120 to the maintenance target machine 140 according to the embodiment of this invention.

The control information 1470 includes a maintenance mode flag 1471, a maintenance operation name 1472, and a maintenance operation number 1473. The maintenance mode flag 1471 is information indicating whether or not the maintenance operation identified by the maintenance operation name 1472 and the maintenance operation number 1473 is determined to be in execution on the maintenance target machine 140 that is a transmission destination of the control information 1470. The maintenance operation name 1472 and the maintenance operation number 1473 correspond to the maintenance operation name 1102 and the maintenance operation number 1103 of the maintenance operation table 608, respectively.

FIG. 15 is a flow chart of the event determination processing executed by the management server 120 according to the embodiment of this invention.

First, the event handler 601 of the management server 120 receives the event (Step 1501).

Next, the event handler 601 determines whether or not the event type of the received event is "Normal" or "Maintenance" (Step 1502).

When the event type is "Normal" or "Maintenance", the event handler 601 registers the received event (Step 1503). Details of Step 1503 are described later with reference to FIG. 22.

When the event type is neither "Normal" nor "Maintenance", the event handler 601 determines whether or not the maintenance operation name and the maintenance operation number are included in the received event (Step 1504).

When the maintenance operation name and the maintenance operation number are not included in the received event, the received event in question is the first login event 1420. In this case, the event handler 601 subsequently executes maintenance operation specifying processing as illustrated in FIG. 16.

Figure 19:
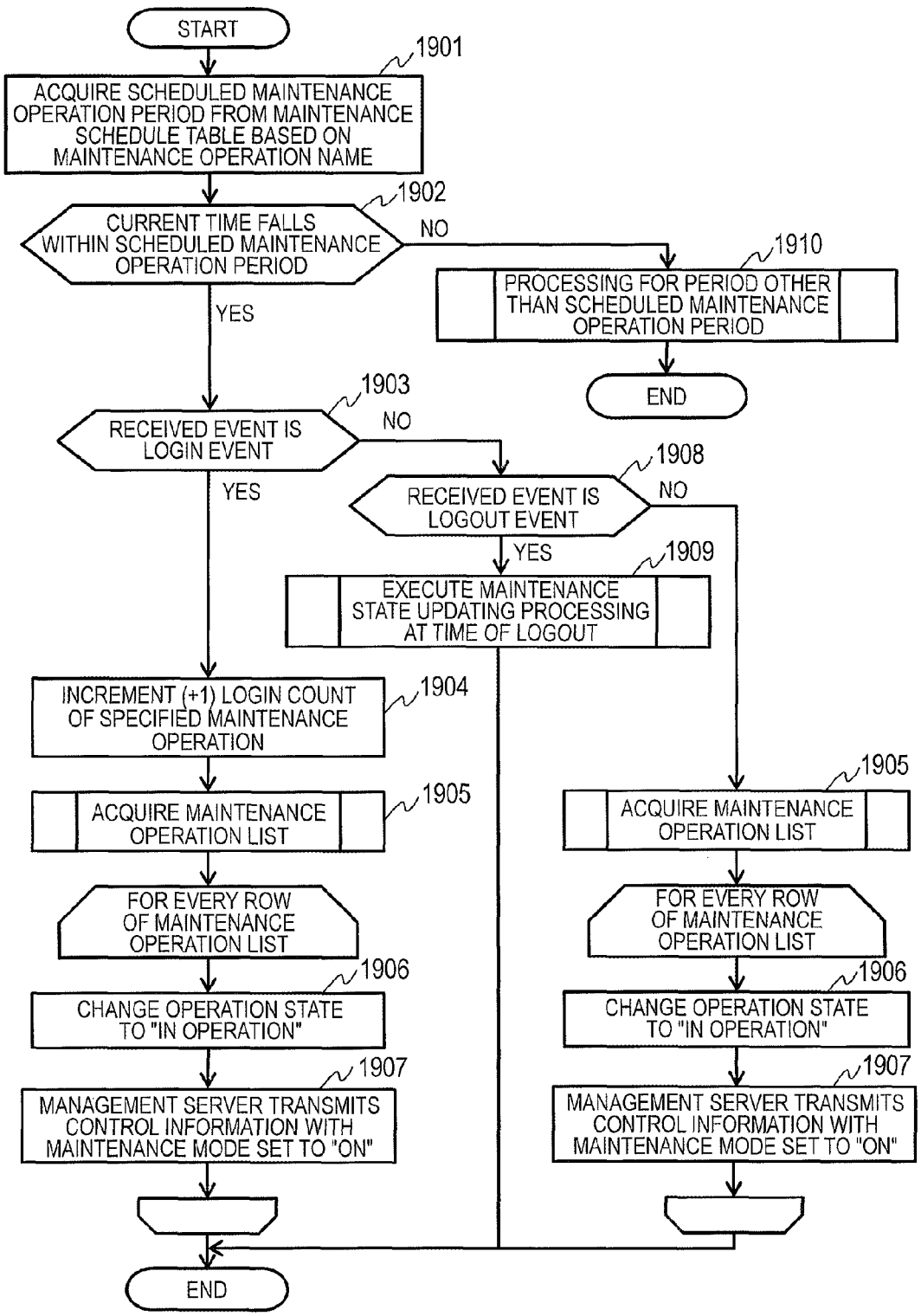
FIG. 19 is a flow chart of maintenance state updating processing executed by the management server according to the embodiment of this invention.

When the maintenance operation name and the maintenance operation number are included in the received event, the received event in question is any one of the second or subsequent login event 1430, the logout event 1440, the logged-in event 1450, and the not-logout event 1460. In this case, the event handler 601 acquires from the received event the maintenance operation name (1431, 1441, 1451, or 1461) and the maintenance operation number (1432, 1442, 1452, or 1462) (Step 1505), and subsequently executes maintenance state updating processing as illustrated in FIG. 19.

Figure 16:
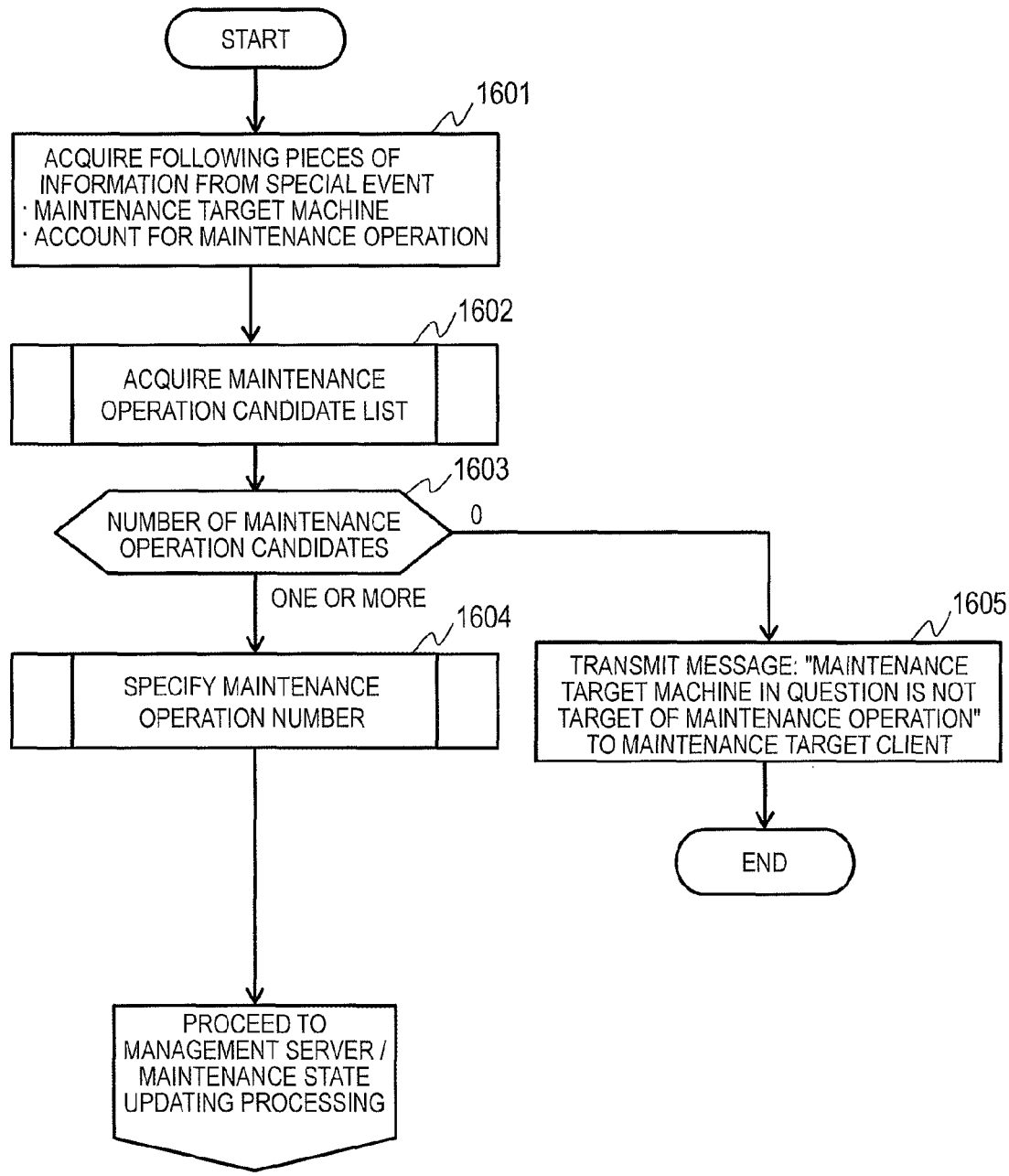
FIG. 16 is a flow chart of maintenance operation specifying processing executed by the management server according to the embodiment of this invention.

FIG. 16 is a flow chart of the maintenance operation specifying processing executed by the management server 120 according to the embodiment of this invention.

The maintenance operation specifying processing is processing of specifying the maintenance operation based on the received event. The maintenance operation specifying processing is executed subsequently to the event determination processing (FIG. 15) only when the first login event is received.

First, the event handler 601 acquires from the received first login event 1420 the transmission source 1421 and the account for maintenance operation 1422 (Step 1601).

Next, the event handler 601 acquires a maintenance operation candidate list (Step 1602). Details of Step 1602 are described later with reference to FIG. 17.

Next, the event handler 601 determines whether or not a number of maintenance operation candidates included in the maintenance operation candidate list is one or more (Step 1603). When the number of maintenance operation candidates included in the maintenance operation candidate list is one or more, the event handler 601 specifies the maintenance operation number (Step 1604), and subsequently executes the maintenance state updating processing as illustrated in FIG. 19. Details of Step 1604 are described later with reference to FIG. 18. When the number of maintenance operation candidates included in the maintenance operation candidate list is not one or more, a schedule of the maintenance operation to be executed on the maintenance target machine 140 that is the transmission source of the received login event 1420 is not registered in the maintenance schedule table, and hence the event handler 601 transmits to the maintenance target client 130 a message indicating that the maintenance target machine 140 that is the transmission source is not the target of the maintenance operation (Step 1605), and brings the maintenance operation specifying processing to an end.

Figure 17:
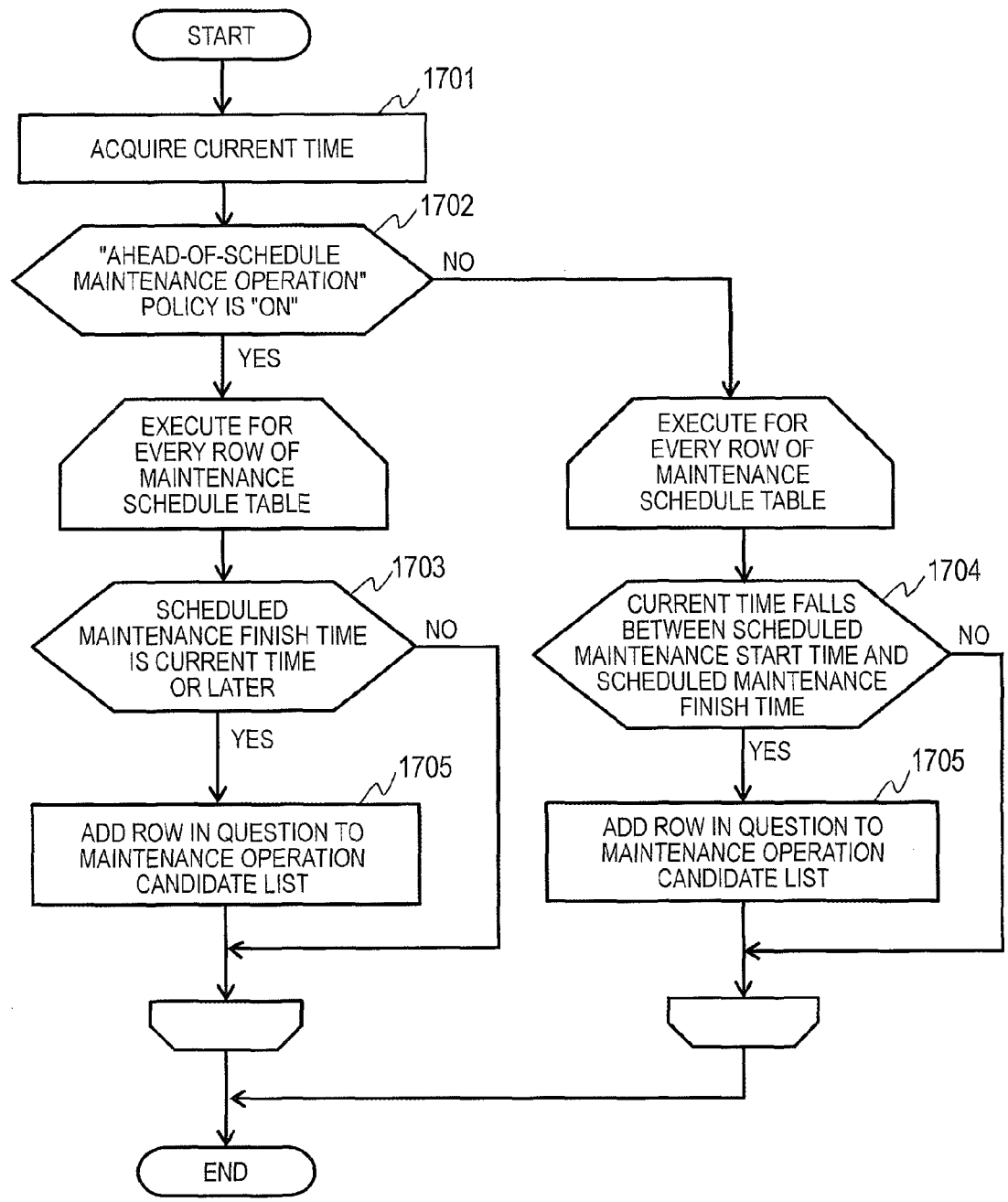
FIG. 17 is a flow chart of maintenance operation candidate list acquisition processing executed by the management server according to the embodiment of this invention.

FIG. 17 is a flow chart of maintenance operation candidate list acquisition processing executed by the management server 120 according to the embodiment of this invention.

The maintenance operation candidate list acquisition processing is executed in Step 1602 of FIG. 16. First, the event handler 601 acquires a current time (Step 1701). Next, the event handler 601 determines whether or not an "ahead-of-schedule maintenance operation" policy is "ON" (valid) (Step 1702). It should be noted that the "ahead-of-schedule maintenance operation" policy is described later with reference to FIG. 29.

When the "ahead-of-schedule maintenance operation" policy is "ON", even the maintenance operation whose scheduled maintenance start time has not arrived yet may be a candidate for the maintenance operation whose operation is to be executed from the current time on. The event handler 601 accordingly determines, for every row of the maintenance schedule table 607, whether or not the scheduled maintenance finish time 1002 stored in the row is the current time or later (Step 1703). When the scheduled maintenance finish time 1002 is the current time or later, the event handler 601 adds the row in question to the maintenance operation candidate list (Step 1705). On the other hand, when the scheduled maintenance finish time 1002 is not the current time or later, the event handler 601 does not execute Step 1705 on the row in question. The event handler 601 repeatedly executes Step 1703 and (when the condition is satisfied) Step 1705 until the processing is finished for every row of the maintenance schedule table 607.

When the "ahead-of-schedule maintenance operation" policy is "OFF", the maintenance operation whose scheduled maintenance start time has not arrived yet cannot be a candidate for the maintenance operation whose operation is to be executed from the current time on. The event handler 601 accordingly determines, for every row of the maintenance schedule table 607, whether or not the current time falls between the scheduled maintenance start time 1001 and the scheduled maintenance finish time 1002 stored in the row (Step 1704). When the current time falls between the scheduled maintenance start time 1001 and the scheduled maintenance finish time 1002, the event handler 601 executes Step 1705. Otherwise, the event handler 601 does not execute Step 1705. The event handler 601 repeatedly executes Step 1704 and (when the condition is satisfied) Step 1705 until the processing is finished for every row of the maintenance schedule table 607.

The maintenance operation candidate list acquired as a result of the above-mentioned processing is a list of rows that satisfy the condition of Step 1703 or 1704 of all rows included in the maintenance schedule table 607, and each of the row includes the scheduled maintenance start time 1001, the scheduled maintenance finish time 1002, and the maintenance operation name 1003.

Figure 18:
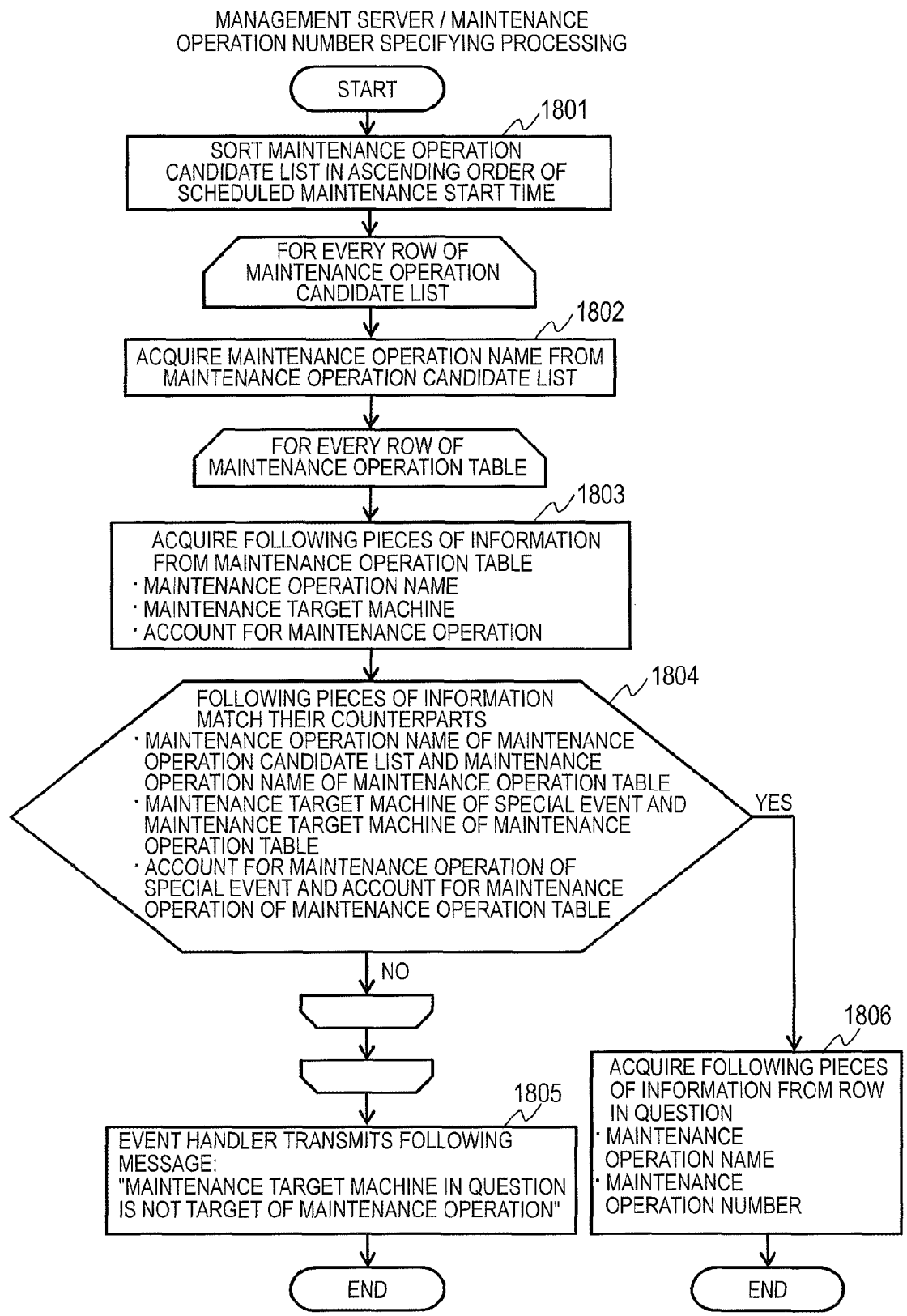
FIG. 18 is a flow chart of maintenance operation number specifying processing executed by the management server according to the embodiment of this invention.

FIG. 18 is a flow chart of maintenance operation number specifying processing executed by the management server 120 according to the embodiment of this invention.

The maintenance operation number specifying processing is processing of specifying the maintenance operation name and the maintenance operation number when the first login is detected, and is executed in Step 1604 of FIG. 16.

First, the event handler 601 sorts the maintenance operation candidate list in ascending order of the scheduled maintenance start time 1001 (Step 1801). Next, the event handler 601 selects one row in order from a first row of the sorted maintenance operation candidate list, and acquires the maintenance operation name 1003 from the selected row (Step 1802). Next, the event handler 601 acquires, from one row of the maintenance operation table 608, the maintenance operation name 1102, the maintenance target machine 1104, and the account for maintenance operation 1105 (Step 1803).

Next, the event handler 601 determines whether or not the maintenance operation name acquired in Step 1802 matches the maintenance operation name 1102 acquired in Step 1803, the transmission source 1421 included in the received event (in other words, the first login event received in Step 1501) matches the maintenance target machine 1104 acquired in Step 1803, and the account for maintenance operation 1422 of the received event matches the account for maintenance operation 1105 acquired in Step 1803 (Step 1804).

When all values used for the comparison in Step 1804 match their counterparts, the event handler 601 determines the maintenance operation associated with those values as the maintenance operation to be executed and acquires the maintenance operation name 1102 and the maintenance operation number 1103 of the row of the maintenance operation table 608, which are acquired in Step 1803 (Step 1806). Then, the event handler 601 brings the maintenance operation number specifying processing to an end.

It should be noted that a plurality of rows of the maintenance operation candidate list may satisfy the condition of Step 1804 in actuality. However, the rows of the maintenance operation candidate list are sorted in ascending order of the scheduled maintenance start time 1001 in Step 1801, the determination of Step 1804 is performed in order from the first row of the sorted maintenance operation candidate list, and the maintenance operation number specifying processing is brought to an end when the condition is satisfied. Accordingly, the maintenance operation associated with the row that has the earliest scheduled maintenance start time 1001 of the plurality of rows that satisfy the condition is determined as the maintenance operation to be executed.

On the other hand, any one of the values used for the comparison does not match its counterpart even after Step 1804 is executed on every combination of every row of the maintenance operation candidate list and every row of the maintenance operation table 608, the event handler 601 transmits to the maintenance target client 130 the message indicating that the maintenance target machine 140 that is the transmission source of the received event is not the target of the maintenance operation (indicating, in other words, that the maintenance operation is to be executed on the maintenance target machine 140 on which the execution of the maintenance operation is not scheduled) (Step 1805), and brings the maintenance operation number specifying processing to an end.

FIG. 19 is a flow chart of the maintenance state updating processing executed by the management server 120 according to the embodiment of this invention.

The maintenance state updating processing is processing that is executed subsequently to the event determination processing (FIG. 15) or the maintenance operation specifying processing (FIG. 16). The maintenance state updating processing is executed in order to update the operation state 1106 of the maintenance operation table 608 and transmit the control information to the maintenance target machine 140. First, the event handler 601 searches for the row of the maintenance schedule table 607 having the maintenance operation name 1003 that matches the maintenance operation name acquired in Step 1505 of FIG. 15 or in Step 1806 of FIG. 18, and acquires the scheduled maintenance start time 1001 and the scheduled maintenance finish time 1002 of the row retrieved by this search (Step 1901).

Next, the event handler 601 determines whether or not the current time acquired from a timer (not shown) of the management server 120 falls within the scheduled maintenance operation period from the scheduled maintenance start time 1001 to the scheduled maintenance finish time 1002, which are acquired in Step 1901 (Step 1902).

When the current time falls within the scheduled maintenance operation period, the event handler 601 determines whether or not the received event is the login event (in other words, the first login event 1420 or the second or subsequent login event 1430) (Step 1903).

When the received event is the login event, the event handler 601 increments (+1) the value of the login count 1107 of the row of the maintenance operation table 608 having the maintenance operation name 1102 and the maintenance operation number 1103 that match the maintenance operation name and the maintenance operation number, respectively, that are acquired in Step 1505 of FIG. 15 or in Step 1806 of FIG. 18 (Step 1904).

Next, the event handler 601 acquires a maintenance operation list (Step 1905). Details of Step 1905 are described later with reference to FIG. 20. Next, the event handler 601 changes the operation state 1106 of every row that is identified by every ID 1101 registered in the maintenance operation list to "In Operation" (Step 1906). A current value of the operation state 1106 associated with a given maintenance operation being "In Operation" means that the given maintenance operation is determined to be in execution at the current time, and in Step 1906, means that the current time falls within the maintenance operation period of the given maintenance operation.

The management server 120 then transmits the control information 1470 having "ON" set as the value of the maintenance mode flag 1471 to the maintenance target machine 140 that is identified by the maintenance target machine 1104 of every row identified by every ID 1101 registered in the maintenance operation list (1907). The maintenance target machine 140 that has received this control information 1470 changes the value of the maintenance mode flag of its own control information table 703 to "ON". This change of the maintenance mode flag corresponds to the change at the time of the login in each of Cases 1, 2, 4, and 6, and to the change at the time of the first login in Case 5 as shown in FIGS. 3 to 5.

When it is determined in Step 1903 that the received event is not the login event, the event handler 601 determines whether or not the received event is the logout event (Step 1908). When the received event is the logout event, the event handler 601 executes maintenance state updating processing at the time of the logout (Step 1909). Details of Step 1909 are described later with reference to FIG. 21.

When it is determined in Step 1908 that the received event is not the logout event, this case corresponds to a case where the scheduled maintenance start time arrives in Case 3. Step 1905 is accordingly executed, and Steps 1906 and 1907 are subsequently executed on every row of the maintenance operation list. This change of the maintenance mode flag in Step 1907 corresponds to the change at the scheduled maintenance start time in Case 3 as shown in FIG. 3.

When it is determined in Step 1902 that the acquired current time does not fall within the scheduled maintenance operation period, this case corresponds to a case where the logout is performed in Case 2 or a case where the login is performed in Case 3. The event handler 601 accordingly executes processing for a period other than the scheduled maintenance operation period (Step 1910). Details of Step 1910 are described later with reference to FIG. 23.

With this, the maintenance state updating processing is brought to an end.

Figure 20:
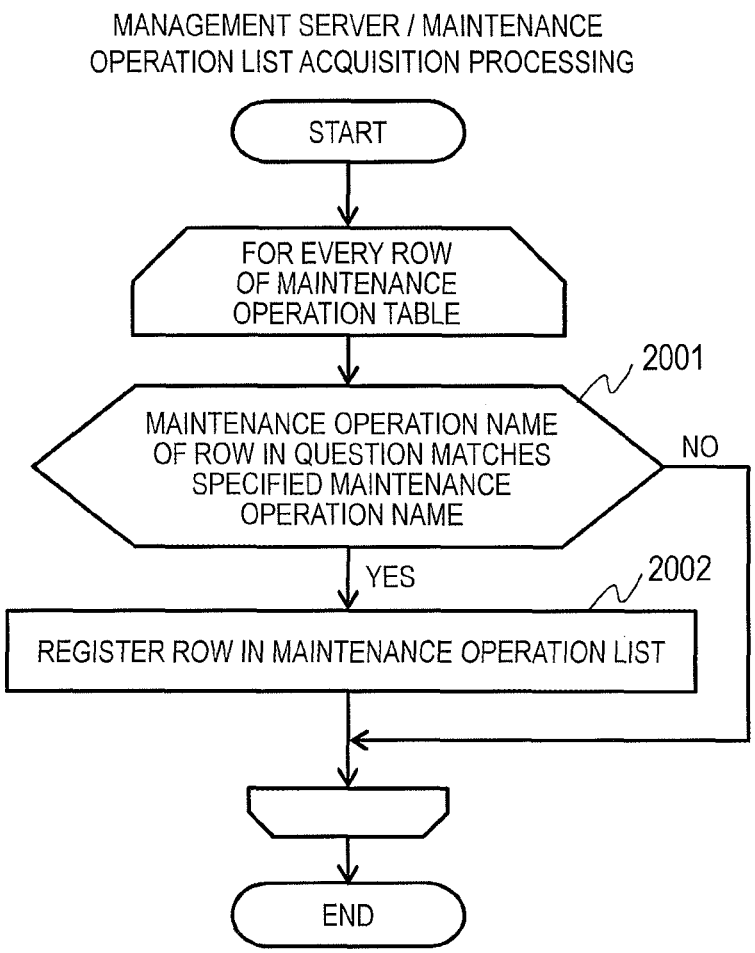
FIG. 20 is a flow chart of maintenance operation list acquisition processing executed by the management server according to the embodiment of this invention.

FIG. 20 is a flow chart of maintenance operation list acquisition processing executed by the management server 120 according to the embodiment of this invention.

The maintenance operation list acquisition processing is executed in Step 1905 of FIG. 19, and in Step 2105 of FIG. 21 to be described later. The maintenance operation is concurrently executed on the plurality of maintenance target machines 140, and hence in the maintenance operation table 608, one maintenance operation is managed as a plurality of operations. The maintenance operation list acquisition processing is processing of specifying the operations belonging to the same maintenance operation (in other words, the rows of the maintenance operation table 608 relating to the same maintenance operation).

The event handler 601 determines, for every row of the maintenance operation table 608, whether or not the maintenance operation name 1102 of the row matches the maintenance operation name acquired in Step 1505 of FIG. 15 or in Step 1806 of FIG. 18 (Step 2001), and temporarily registers the ID 1101 of the row in which those maintenance operation names match in the maintenance operation list (Step 2002).

Figure 21:
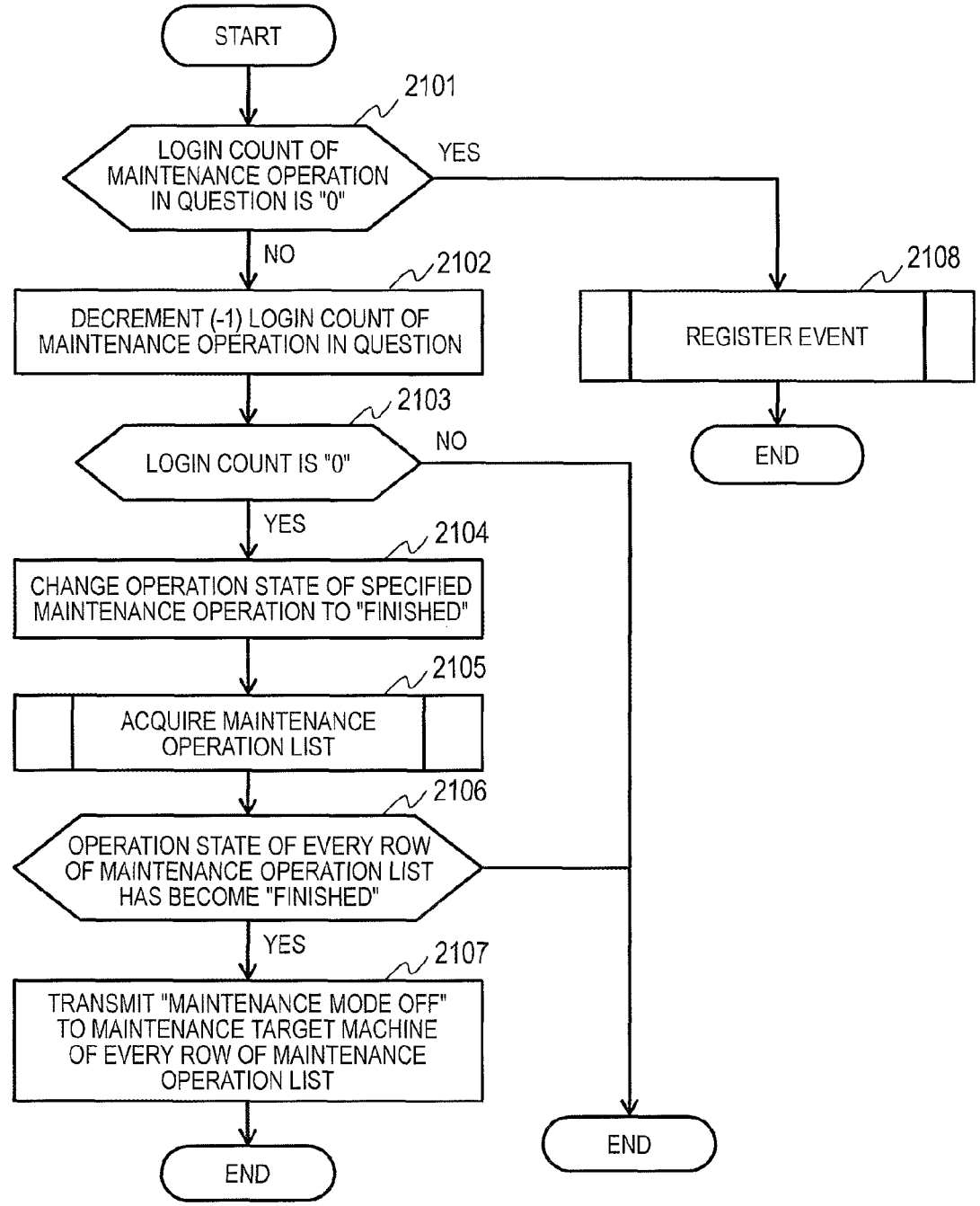
FIG. 21 is a flow chart of maintenance state updating processing at the time of the logout executed by the management server according to the embodiment of this invention.

FIG. 21 is a flow chart of the maintenance state updating processing at the time of the logout executed by the management server 120 according to the embodiment of this invention.

The maintenance state updating processing at the time of the logout is processing of updating the operation state and transmitting the control information to the maintenance target machine 140. This processing is executed in Step 1909 of FIG. 19.

First, the event handler 601 determines whether or not the value of the login count 1107 of the row of the maintenance operation table 608 having the maintenance operation name 1102 and the maintenance operation number 1103 that match the maintenance operation name and the maintenance operation number, respectively, that are acquired in Step 1505 of FIG. 15 is "0" (Step 2101).

When the login count 1107 is not "0", the event handler 601 decrements (−1) the value of the login count 1107 of the row specified in Step 2101 (Step 2102).

Next, the event handler 601 determines whether or not the value of the login count 1107 of the row specified in Step 2101 is "0" (Step 2103).

When the value of the login count 1107 of the row specified in Step 2101 is "0", the event handler 601 changes the value of the operation state 1106 of the row in question to "Finished" (Step 2104).

Next, the event handler 601 acquires the maintenance operation list in accordance with the procedure described above with reference to FIG. 20 (Step 2105).

Next, the event handler 601 determines whether or not the value of the operation state 1106 of every row specified by every ID 1101 included in the maintenance operation list has become "Finished" (Step 2106).

When it is determined in Step 2106 that the value of the operation state 1106 of every row has become "Finished", every operation associated with the maintenance operation name acquired in Step 1505 of FIG. 15 has been finished, and hence the event handler 601 transmits the control information 1470 having "OFF" set as the value of the maintenance mode flag 1471 to every maintenance target machine 140 specified by the maintenance target machine 1104 of the above-mentioned every row (2107).

The maintenance target machine 140 that has received this control information 1470 changes the value of the maintenance mode flag of its own control information table 703 to "OFF".

The change of the maintenance mode flag in Step 2107 corresponds to the change at the time of the logout in Case 1, Case 3 (when the "ahead-of-schedule maintenance operation" policy is "ON"), and Case 4 and to the change at the time of the last logout in Case 5. Specifically, with this change, even if the scheduled maintenance finish time has not arrived yet, when the value of the login count 1107 of every maintenance target machine 140 has become "0", it is determined that the maintenance operation is not in execution in any of the maintenance target machines 140, and then the value of the maintenance mode flag is changed to "OFF".

When it is determined in Step 2103 that the value of the login count 1107 is not "0" and when it is determined in Step 2106 that the value of the operation state 1106 of any one of the rows has not become "Finished", any of the operations associated with the maintenance operation name acquired in Step 1505 of FIG. 15 is still being executed by the maintenance target machine 140, and hence Steps 2104, 2105, and 2107 are not executed.

When it is determined in Step 2101 that the login count 1107 is "0", this case corresponds to a case where a failure to detect the login has occurred and only the logout has been detected as in Case 7, and hence the management server 120 creates the event and registers the created event (Step 2108). Details of Step 2108 are described later with reference to FIG. 22.

With this, the maintenance state updating processing at the time of the logout is brought to an end.

Figure 22:
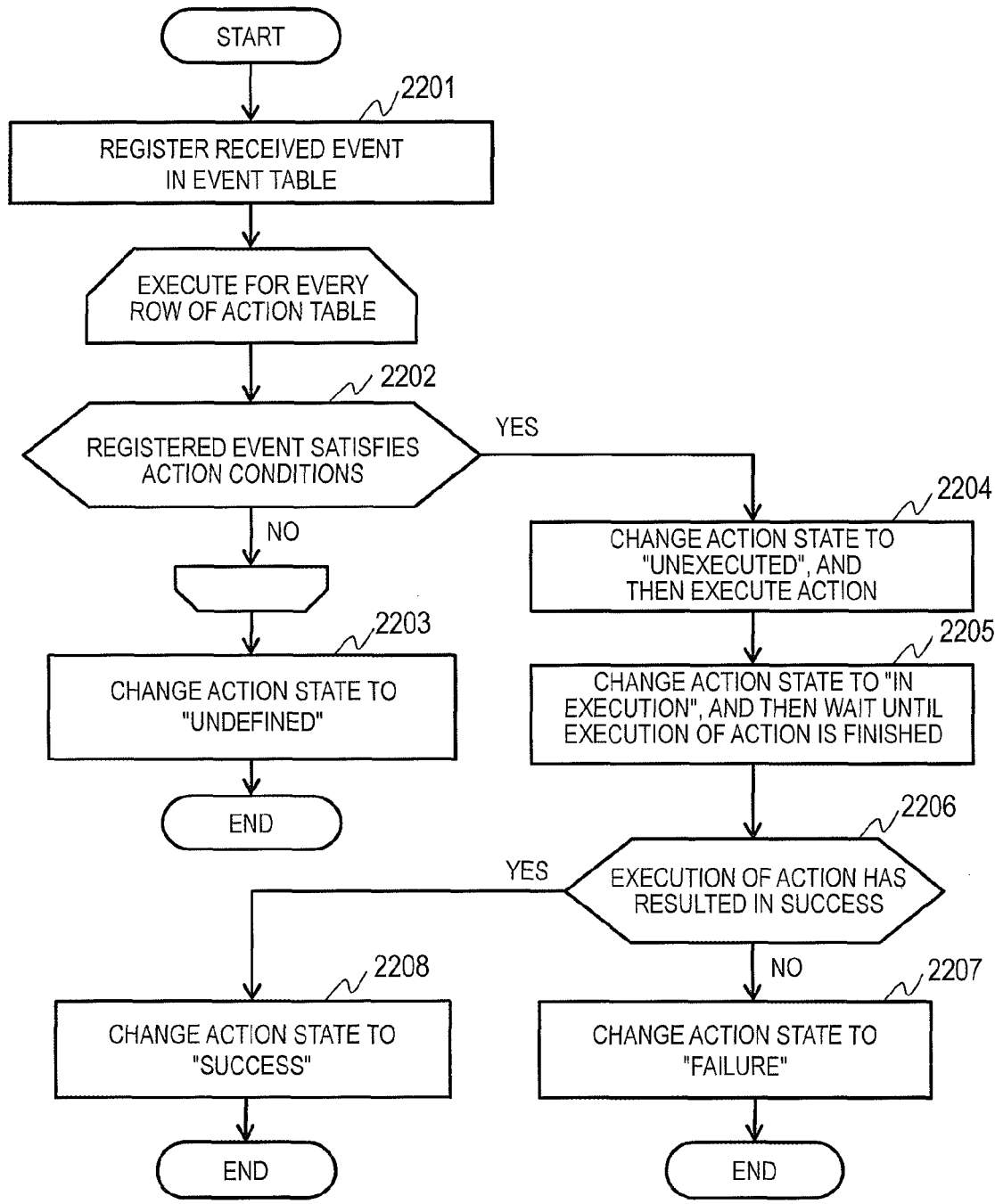
FIG. 22 is a flow chart of event registration processing executed by the management server according to the embodiment of this invention.

FIG. 22 is a flow chart of event registration processing executed by the management server 120 according to the embodiment of this invention.

The event registration processing is processing of registering the received event and automatically executing a predetermined action in accordance with the registered event, and is executed in Step 1503 of FIG. 15, Step 2108 of FIG. 21, and Step 2307 of FIG. 23 to be described later.

First, the event handler 601 registers the received event in the event table 605 (Step 2201). For example, when receiving the normal event 1400 or the maintenance event 1410, the event handler 601 registers in the event table 605 the values of the event occurrence time 1401 or 1411, the event ID 1402 or 1412, the message 1403 or 1413, the transmission source 1404 or 1414, and the event type 1405 or 1415 as the event occurrence time 807, the event ID 801, the message 802, the transmission source 804, and the event type 806, respectively.

In addition, the event handler 601 determines the values of the level of importance 803 and the action state 805 based on the received event, and registers the determined values in the event table 605. First, a description is given of the level of importance 803. The management server 120 may store information defining a condition to be satisfied by the received event and the value of the level of importance associated with the condition, and when the received event satisfies the above-mentioned condition, register the value of the level of importance associated with the satisfied condition as the level of importance 803. The condition at this time may include the type of the received event. For example, when a condition that the received event is the maintenance event 1410" and a level of importance "Info" associated with the condition are defined, "Info", which is the least value, is registered as the level of importance 803 associated with the maintenance event 1410. Meanwhile, a predetermined initial value may be registered as the action state 805.

It should be noted that in the above-mentioned example, the received event is registered in the event table 605 irrespective of whether or not the received event is the maintenance event 1410, but the processing of the event handler 601 may be executed in such a manner that the received event is not registered in the event table 605 when the received event is the maintenance event 1410.

Next, the event handler 601 determines whether or not, for each row of the action table 606, the event registered in Step 2201 satisfies the action conditions 903 to 905 of the row (Step 2202). Specifically, the event handler 601 determines that the action conditions are satisfied when a relationship between the value associated with the action condition (attribute name) 903 and the value associated with the action condition (attribute value) 904 that are acquired from the registered event satisfies a condition defined by the action condition (condition) 905. For example, when the ID of the registered event matches "Event 080" and the level of importance of the event is "Error" or more, it is determined that the action conditions relating to the action identified by the action name "recovery" are satisfied as shown in FIG. 9.

After Step 2202 is executed on every row of the action table 606, when the action conditions 903 to 905 of none of the rows are satisfied, the event handler 601 changes the value of the action state 805 of the registered event to "Undefined" (Step 2203).

When the action conditions 903 to 905 of any one of the rows of the action table 606 are satisfied, the event handler 601 changes the value of the action state 805 of the registered event to "Unexecuted". After that, the management server 120 communicates to/from the maintenance target machine 140 that is the transmission source of the registered event, and causes the maintenance target machine 140 to execute the action identified by the action 908 of the row in question of the action table 606 (Step 2204).

After that, the event handler 601 changes the value of the action state 805 of the registered event to "In Execution", and waits until the maintenance target machine 140 finishes executing the action (Step 2205). After that, the event handler 601 determines whether or not the execution of the action has resulted in success based on a return value of the action from the maintenance target machine 140 (Step 2206). When determining that the execution of the action has resulted in failure, the event handler 601 changes the value of the action state 805 of the registered event to "Failure" (Step 2207). When determining that the execution of the action has resulted in success, the event handler 601 changes the value of the action state 805 to "Success" (Step 2208).

With this, the event registration processing is brought to an end.

Through the event registration processing described above, for example, when a failure occurs on the maintenance target machine 140 in a normal operation state and an event for notifying of the failure is transmitted, the management server 120 can automatically execute processing associated with the received event (for example, processing for a failure recovery or processing of notifying the administrator 161 of the failure). However, a similar event may occur owing to a maintenance operation when the maintenance operation is in execution on the maintenance target machine 140, and the action similar to the one to be executed at the time of the normal operation may not need to be executed on such event. According to the event registration processing described above, the management server 120 determines the level of importance depending on whether or not the received event is the maintenance event or defines the action that is determined depending on whether or not the received event is the maintenance event (see, for example, a first row of the action table 606 of FIG. 9). In this manner, the management server 120 can execute the action that is determined depending on whether or not the received event is the maintenance event (in other words, whether or not the maintenance operation is in execution on the maintenance target machine that has transmitted to the received event).

Figure 23:
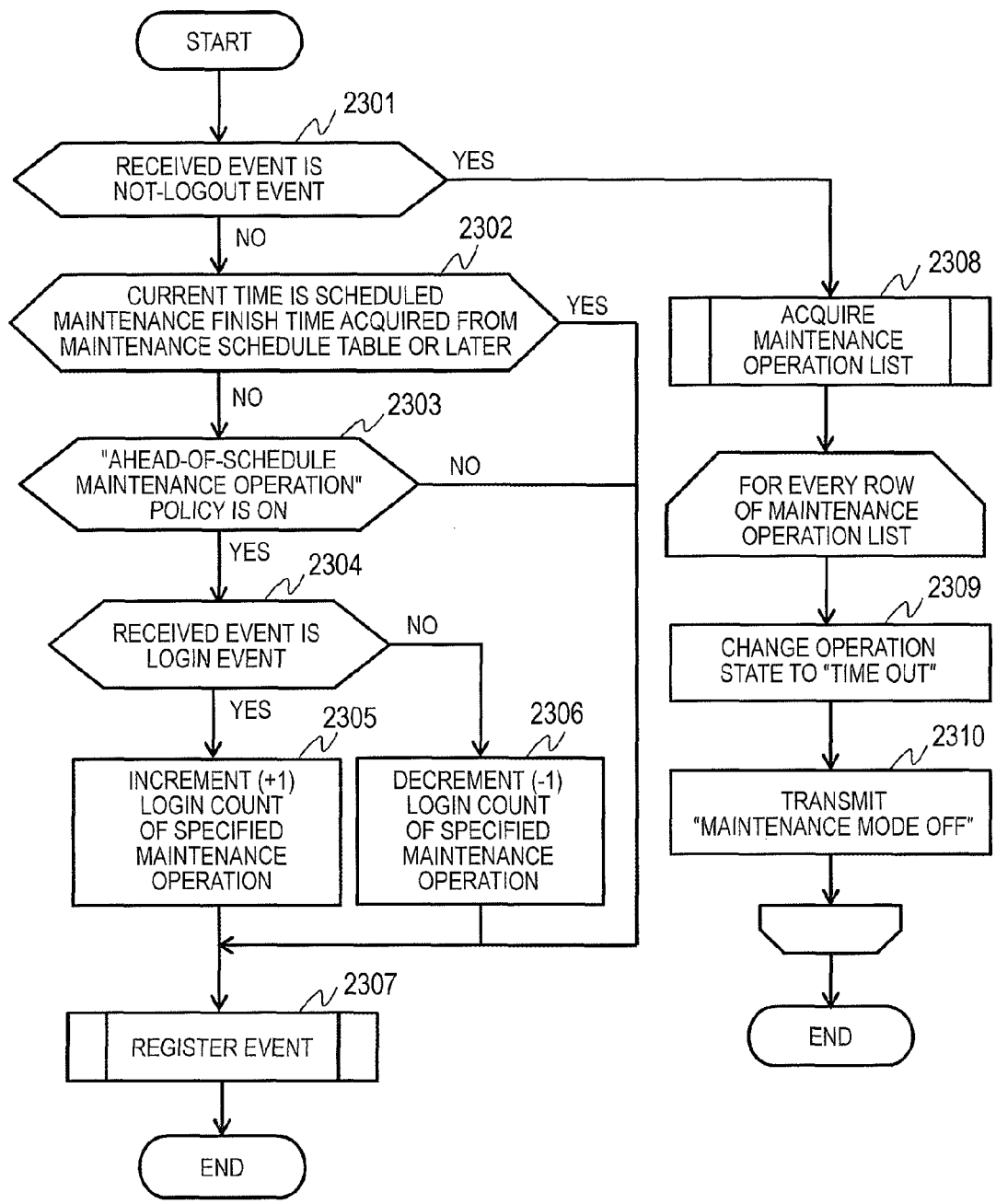
FIG. 23 is a flow chart of unscheduled maintenance operation processing executed by the management server according to the embodiment of this invention.

FIG. 23 is a flow chart of unscheduled maintenance operation processing executed by the management server 120 according to the embodiment of this invention.

The unscheduled maintenance operation processing is processing that is executed when the maintenance operation is executed during a period other than the scheduled maintenance operation period.

First, the event handler 601 determines whether or not the received event is the not-logout event 1460 (Step 2301).

When the received event is not the not-logout event 1460, the event handler 601 determines whether or not the current time is the scheduled maintenance finish time acquired from the maintenance schedule table or later (Step 2302). When the current time is earlier than the scheduled maintenance finish time acquired from the maintenance schedule table, the event handler 601 determines whether or not the "ahead-of-schedule maintenance operation" policy stored in the policy table 609 is "ON" (Step 2303).

When the "ahead-of-schedule maintenance operation" policy is "ON", the event handler 601 determines whether or not the received event is the login event (in other words, the first login event 1420 or the second or subsequent login event 1430) (Step 2304).

When the received event is the login event, the event handler 601 increments (+1) the login count 1107 of the row of the maintenance operation table 608 having the maintenance operation name 1102 and the maintenance operation number 1103 that match the maintenance operation name and the maintenance operation number, respectively, that are acquired in Step 1806 of FIG. 18 (Step 2305). This corresponds to the login in Case 3.

When the received event is not the login event, the received event is the logout event. In this case, the event handler 601 decrements (−1) the login count 1107 of the row of the maintenance operation table 608 having the maintenance operation name 1102 and the maintenance operation number 1103 that match the maintenance operation name and the maintenance operation number, respectively, that are acquired in Step 1505 of FIG. 15 (Step 2306). This corresponds to the logout in Case 3.

After that, the management server 120 creates the event in accordance with the procedure described above with reference to FIG. 22, and registers the created event (Step 2307).

When it is determined in Step 2302 that the current time is the scheduled maintenance finish time acquired from the maintenance schedule table or later, Step 2307 is executed without executing Steps 2303 to 2306.

When it is determined in Step 2303 that the "ahead-of-schedule maintenance operation" policy is "OFF", Step 2307 is executed without executing Steps 2304 to 2306.

When it is determined in Step 2303 that the received event is the not-logout event 1460, this case corresponds to a case where the scheduled maintenance finish time has arrived in Case 2. In this case, the event handler 601 acquires the maintenance operation list in accordance with the procedure illustrated in FIG. 20 (Step 2308), and changes the value of the operation state 1106 of the row of the maintenance operation table 608 that is associated with the ID 1101 included in the acquired maintenance operation list to "Time Out" (Step 2309). The management server 120 then transmits the control information 1470 having "OFF" set as the maintenance mode flag 1471 to every maintenance target machine 140 specified by the maintenance target machine 1104 of the row in question (Step 2310). The maintenance target machine 140 that has received the control information 1470 changes the value of the maintenance mode flag of its own control information table 703 to "OFF".

With this, the unscheduled maintenance operation processing is brought to an end.

Figure 24:
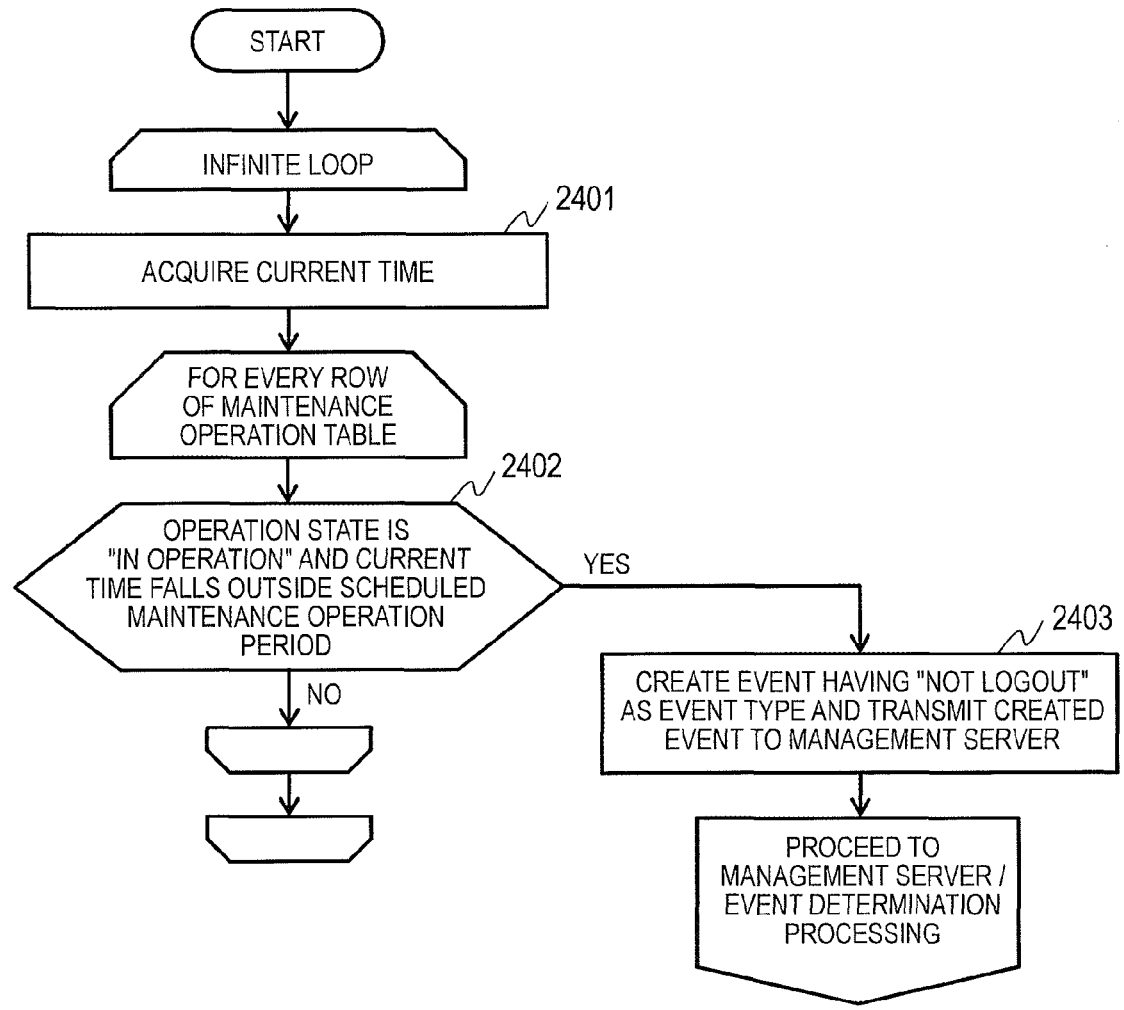
FIG. 24 is a flow chart of time-out processing executed by the management server according to the embodiment of this invention.

FIG. 24 is a flow chart of time-out processing executed by the management server 120 according to the embodiment of this invention.

The time-out processing is processing of transmitting the not-logout event 1460 when the scheduled maintenance finish time arrives. First, the event handler 601 acquires the current time from the timer (Step 2401). Next, the event handler 601 determines whether or not, for each row of the maintenance operation table 608, the value of the operation state 1106 of the row is "In Operation" and the current time is the scheduled maintenance finish time defined by the row of the maintenance schedule table 607 that is associated with the maintenance operation name 1102 of the row in question or later (Step 2402).

When any one of the rows of the maintenance operation table 608 satisfies the condition of Step 2402, the event handler 601 creates the not-logout event 1460 and transmits the created event to the management server 120 (Step 2403). After that, the event determination processing (FIG. 15) is executed.

When none of the rows of the maintenance operation table 608 satisfies the condition of Step 2402, the event handler 601 newly acquires the current time (Step 2401) and executes Step 2402 with respect to the newly acquired current time. Steps 2401 and 2402 form an infinite loop, and the infinite loop is executed repeatedly.

Figure 25:
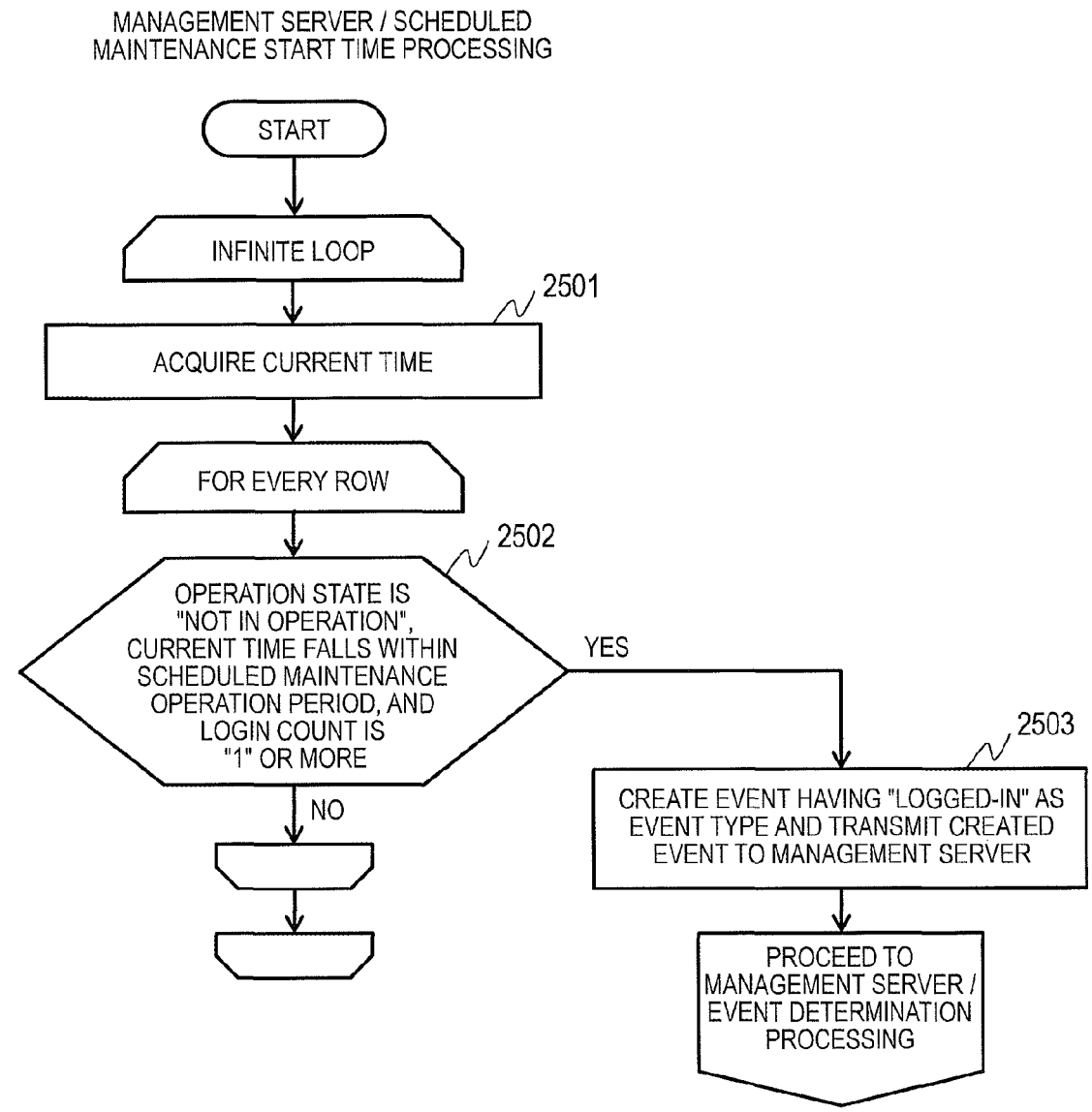
FIG. 25 is a flow chart of scheduled maintenance start time processing executed by the management server according to the embodiment of this invention.

FIG. 25 is a flow chart of scheduled maintenance start time processing executed by the management server 120 according to the embodiment of this invention.

The scheduled maintenance start time processing is processing of transmitting the logged-in event 1450 when the scheduled maintenance start time arrives. First, the event handler 601 acquires the current time from the timer (Step 2501). Next, the event handler 601 determines, for each row of the maintenance operation table 608, whether or not the value of the operation state 1106 of the row is "Not In Operation", the value of the login count 1107 of the row is "1" or more, and the current time is the scheduled maintenance start time defined by the row of the maintenance schedule table 607 that is associated with the maintenance operation name 1102 of the row in question or later (Step 2502).

When any one of the rows of the maintenance operation table 608 satisfies the condition of Step 2502, the event handler 601 creates the logged-in event 1450 and transmits the created event to the management server 120 (Step 2503). After that, the event determination processing (FIG. 15) is executed.

When none of the rows of the maintenance operation table 608 satisfies the condition of Step 2502, the event handler 601 newly acquires the current time (Step 2501) and executes Step 2502 with respect to the newly acquired current time. Steps 2501 and 2502 form an infinite loop, and the infinite loop is executed repeatedly.

For example, in a case where the "ahead-of-schedule maintenance operation" policy is "ON" in Case 3, when the management server 120 receives the login event before the scheduled maintenance start time, the maintenance operation associated with the login in question is added to the maintenance operation candidate list while the maintenance mode flag is maintained to be "OFF" (Step 1705), and the login count is then incremented (Step 2305). The condition of Step 2502 is accordingly satisfied when the scheduled maintenance start time arrives after that, and the logged-in event is created (Step 2503). In response to the created logged-in event, the management server 120 changes the maintenance mode flag for the maintenance operation in question to "ON" (Step 1907). In this manner, the change of the maintenance mode flag at the scheduled maintenance start time in Case 3 is realized.

FIG. 26 is an explanatory diagram of a first example of a maintenance schedule entry screen according to the embodiment of this invention.

The maintenance schedule entry screen is a screen displayed by the I/O 114 of the management client 110 in order to input a maintenance schedule to the management server 120. FIG. 26 illustrates an example of the screen.

The maintenance schedule entry screen 2600 includes a maintenance operation name entry part 2601, a maintenance operation target setting part 2602, a scheduled maintenance operation period setting part 2607, an OK button 2608, and a cancel button 2609. The maintenance operation name identifying the maintenance operation for which a schedule is to be entered from now is entered by the administrator 161 into the maintenance operation name entry part 2601. Information indicating the target of the maintenance operation, such as a plurality of pairs of identification information of the maintenance target machine 140 and the account for maintenance operation to be used for the maintenance operation, is displayed in the maintenance operation target setting part 2602. The administrator 161 selects a pair of the identification information of the maintenance target machine 140 (machine name) and the account for maintenance operation associated with the maintenance operation for which the schedule is to be entered from now, and enters the selected pair. The machine name entered here is displayed on a scheduled maintenance operation period entry part 2606 to be described later.

The maintenance schedule that has already been set is displayed in the scheduled maintenance operation period setting part 2607. The administrator 161 can further set a new maintenance schedule by operating the scheduled maintenance operation period setting part 2607. The scheduled maintenance operation period setting part 2607 includes a date designation tab 2603 and a machine designation tab 2604, and the administrator 161 can select one of those tabs. An example of the scheduled maintenance operation period setting part 2607 displayed when the date designation tab 2603 is selected is illustrated in FIG. 26.

The scheduled maintenance operation period setting part 2607 displayed when the date designation tab 2603 is selected includes a date selection part 2605 and the scheduled maintenance operation period entry part 2606. When the administrator 161 operates the date selection part 2605 and selects a date of the maintenance schedule to be entered, the maintenance schedule that has already been set for each maintenance target machine 140 on the selected date is displayed in the scheduled maintenance operation period entry part 2606. The administrator 161 can enter or change the maintenance schedule of an arbitrary one of the maintenance target machines 140 on the selected date by operating the scheduled maintenance operation period entry part 2606.

In the example of FIG. 26, the maintenance schedules of four maintenance target machines 140 (specifically, a machine 1 to a machine 4) on Jan. 10, 2012 are displayed in the scheduled maintenance operation period entry part 2606 in the form of a column graph. In this example, the maintenance schedules for the date in question have already been set for the machine 1, the machine 3, and the machine 4 and those schedules are indicated by black columns, but the maintenance schedule has not been set yet for the machine 2. The administrator 161 can newly enter the maintenance schedule of the machine 2 and change the maintenance schedule set for the machine 1 or other machines by, for example, dragging a pointer (not shown) on the screen with use of the pointer device included in the I/O 114.

When the administrator 161 operates the OK button 2608, the maintenance schedules entered into the scheduled maintenance operation period setting part 2607 are determined, and the determined maintenance schedules are registered in the maintenance schedule table 607. When the administrator 161 operates the cancel button 2609, the entries made before the operation are canceled.

FIG. 27 is an explanatory diagram of a second example of the maintenance schedule entry screen according to the embodiment of this invention.

FIG. 27 illustrates an example of a screen displayed when the machine designation tab 2604 is selected in the example of FIG. 26.

The scheduled maintenance operation period setting part 2607 displayed when the machine designation tab 2604 is selected includes a maintenance target machine selection part 2701 and a scheduled maintenance operation period entry part 2702. When the administrator 161 operates the maintenance target machine selection part 2701 and selects the name of the maintenance target machine 140 for which the maintenance schedule is to be set, the maintenance schedules for respective dates that have already been set for the selected maintenance target machine 140 are displayed in the scheduled maintenance operation period entry part 2702 (in the form of, for example, a column graph in the same manner as in FIG. 26). The administrator 161 can enter or change the maintenance schedule of the selected maintenance target machine 140 for an arbitrary one of the dates by, for example, operating the scheduled maintenance operation period entry part 2702 in the same way as in the case of FIG. 26.

FIG. 28 is an explanatory diagram of an event display screen according to the embodiment of this invention.

The event display screen is a screen displayed by the I/O 114 of the management client 110 in order to display the event transmitted to the management server 120. FIG. 28 illustrates an example of the screen.

The event display screen 2800 includes a state display part 2801 and an event list display part 2802. In the event list display part 2802, all events received by the management server 120 from all maintenance target machines 140 are displayed in a list format. Specifically, for example, the level of importance and identification information (event ID) of each of the received events and identification information of the maintenance target machine 140 that has transmitted each of the received events are displayed in the event list display part 2802. In the state display part 2801, a state of the maintenance target machine 140 that has the highest degree of urgency of all the maintenance target machines 140, in other words, the highest one of the levels of importance of the events received from all the maintenance target machines 140 is displayed.

As illustrated in FIG. 28, when the management server 120 receives two events having "Info" as the level of importance from the machine 1, receives an event having "Error" as the level of importance from the machine 2, and receives an event having "Warning" as the level of importance from the machine 3, "Error", which is the highest one of those levels of importance, is displayed in the state display part 2801.

Figure 29:
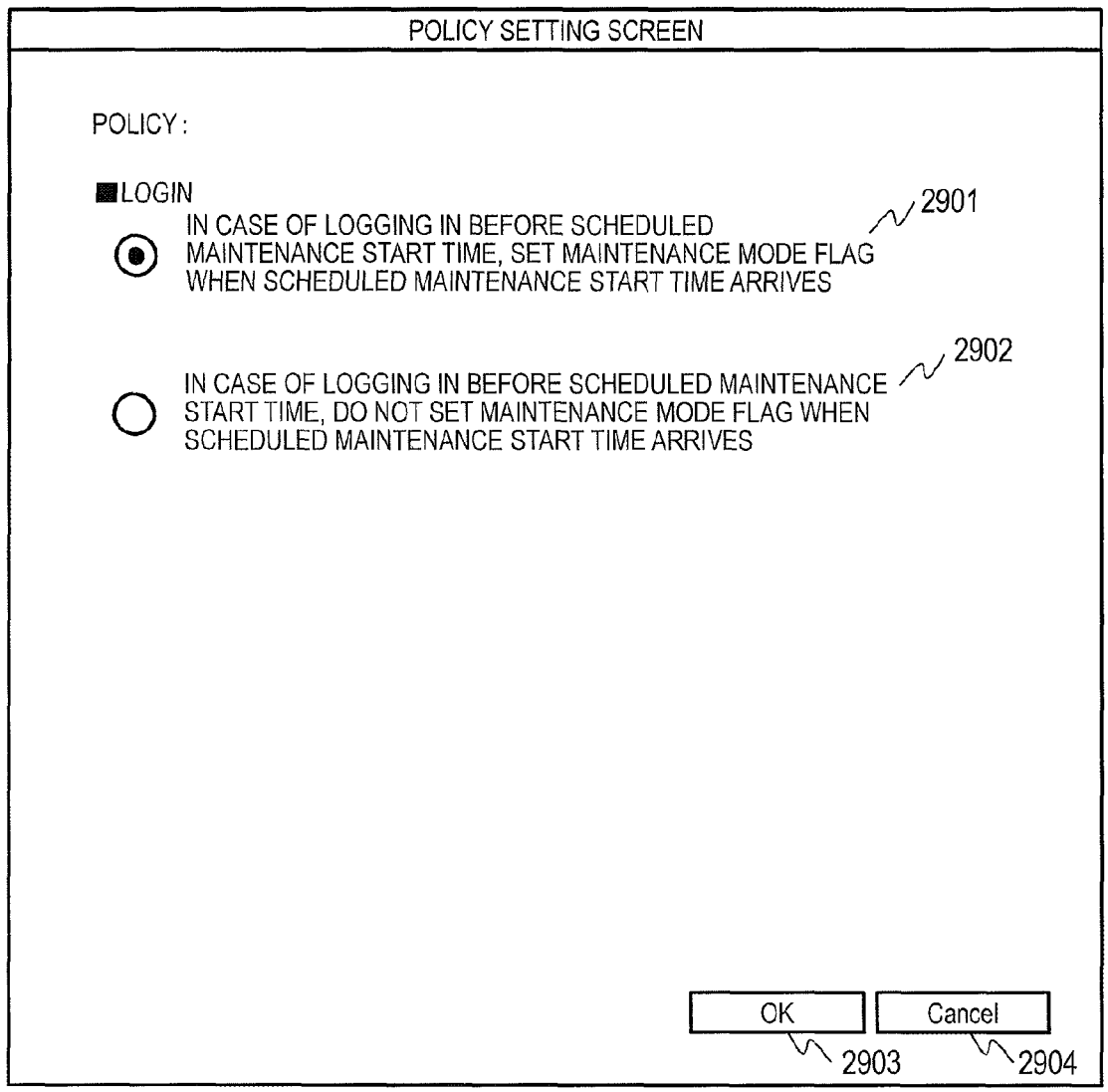
FIG. 29 is an explanatory diagram of a policy setting screen according to the embodiment of this invention.

FIG. 29 is an explanatory diagram of a policy setting screen according to the embodiment of this invention.

The policy setting screen is a screen displayed by the I/O 114 of the management client 110 in order to input the "ahead-of-schedule maintenance operation" policy to the management server 120. FIG. 29 illustrates an example of the screen.

The policy setting screen 2900 includes an "ahead-of-schedule maintenance operation" policy ON input part 2901, an "ahead-of-schedule maintenance operation" policy OFF input part 2902, an OK button 2903, and a cancel button 2904. The "ahead-of-schedule maintenance operation" policy ON input part 2901 and the "ahead-of-schedule maintenance operation" policy OFF input part 2902 include radio buttons associated with the respective parts. The administrator 161 operates those radio buttons in order to set the "ahead-of-schedule maintenance operation" policy to "ON" or "OFF".

In a case where the "ahead-of-schedule maintenance operation" policy is set to "ON", when the login of the account for maintenance operation is performed before the scheduled maintenance start time and then the scheduled maintenance start time arrives, the maintenance mode flag is changed from "OFF" to "ON". On the other hand, in a case where the "ahead-of-schedule maintenance operation" policy is set to "OFF", when the login of the account for maintenance operation is performed before the scheduled maintenance start time and then the scheduled maintenance start time arrives, the maintenance mode flag is not changed to "ON", but maintained to be "OFF".

The embodiment described above may encompass various modification examples. Now, a description is given of one of the modification examples.

In the embodiment describe above, the management server 120 determines whether or not the maintenance operation is started on the maintenance target machine 140 based on the event received from the maintenance target machine 140 (if necessary, based further on the event created by the management server 120 itself), and when it is determined that the maintenance operation is started, transmits the predetermined control information to the maintenance target machine 140. The maintenance target machine 140 that has received the control information changes the maintenance mode flag stored therein to "ON". After that, the maintenance target machine 140 transmits, in place of the event 1400 having "Normal" as the event type, the event 1410 having "Maintenance" as the event type to the management server 120 until the maintenance mode flag is changed to "OFF".

In contrast, the maintenance target machine 140 of this modification example transmits the event 1400 having "Normal" as the event type to the management server 120 even after the management server 120 determines that the maintenance operation is started, and does not transmit the event 1410 having "Maintenance" as the event type. For example, the management server 120 does not execute Step 1907 in which the control information for changing the maintenance mode flag stored in the maintenance target machine 140 to "ON" is transmitted and Step 2107 in which the control information for changing the maintenance mode flag to "OFF" is transmitted. Instead, the management server 120 executes various pieces of processing based on information indicating whether or not the maintenance operation is in execution on each maintenance target machine 140 (for example, the operation state 1106 of the maintenance operation table 608).

For example, in Step 2201 of the event registration processing (FIG. 22), the management server 120 may determine that the received event is the maintenance event when the operation state 1106 associated with the maintenance target machine 140 that is the transmission source of the received event is "IN OPERATION", and determine the level of importance 803 based on the determination. In addition, in the action table 606 (FIG. 9) of this modification example, the value of the operation state 1106 may be designated as one of the action conditions 903 to 905. In this way, the management server 120 of this modification example can execute the action that is determined depending on whether or not the maintenance target machine 140 that has transmitted the event is executing the maintenance operation.

It should be noted that the maintenance target machine 140 of this modification example does not store the maintenance mode flag. Accordingly, when the condition of Step 1301 is satisfied, the maintenance target machine 140 does not execute Steps 1302 and 1304, but execute Step 1303 at any time.

According to the embodiment of this invention described above, it is determined whether or not the event received by the management server 120 is caused by the maintenance operation based on the result of detection of the login and logout of the account for maintenance operation as well as the result of determination as to whether or not the current time falls within the scheduled maintenance operation period. Specifically, the event that occurs during periods other than the period in which the scheduled maintenance operation period overlaps the period from the login of the account for maintenance operation to the logout thereof is treated as the event not caused by the maintenance operation. This prevents the administrator 161 from, for example, failing to detect the failure and the like owing to an erroneous recognition of the event actually not caused by the maintenance operation as the event caused by the maintenance operation and missing an opportunity to execute a necessary measure.

The programs, tables, files, and other types of information for implementing the respective functions of the embodiment described above can be stored in a storage device such as a non-volatile semiconductor memory, a hard disk drive, or a solid state drive (SSD), or a non-transitory computer-readable data storage medium such as an IC card, an SD card, or a DVD.

This invention is not limited to the embodiment described above, and encompasses various modification examples other than the modification example described above. For example, the embodiment has described this invention in detail for the ease of understanding, and this invention is not necessarily limited to a mode that includes all of the configurations described above. A part of the configuration of one embodiment may be replaced with the configuration of another embodiment, and the configuration of one embodiment may be added to the configuration of another embodiment. In each embodiment, another configuration may be added to, deleted from, or replace a part of the configuration of the embodiment.

What is claimed is:

1. A management system, comprising an interface coupled to a network, a processor coupled to the interface, and a storage device coupled to the processor,
   wherein the interface has coupled thereto at least one maintenance target machine to be a target of a maintenance operation, which is identified by one piece of identification information, and
   wherein the management system is configured to:
   store information indicating a scheduled start time and scheduled finish time of the maintenance operation;
   determine, based on the scheduled start time, the scheduled finish time, and a login and logout for the maintenance operation on the at least one maintenance target machine detected by the management system, whether or not the maintenance operation is in execution on the at least one maintenance target machine; and
   determine, based on a result of the determination, whether or not to execute predetermined processing associated with an event transmitted from the at least one maintenance target machine.

2. The management system according to claim 1, wherein the management system is further configured to store at least one account for maintenance operation, and detect a login and logout of any one of the at least one account for maintenance operation as the login and logout for the maintenance operation.

3. The management system according to claim 2, wherein the management system is further configured to determine, in a case where the login for the maintenance operation has not been detected yet in any one of the at least one maintenance target machine at a time point when the scheduled start time arrives, that the maintenance operation is not in execution during a period from the scheduled start time to detection of the login for the maintenance operation on any one of the at least one maintenance target machine, and determine that the maintenance operation is in execution before the scheduled finish time arrives and after the detection of the login for the maintenance operation on the any one of the at least one maintenance target machine.

4. The management system according to claim 3, wherein the management system is further configured to determine, in a case where the maintenance operation is determined to be in execution at a time point when the scheduled finish time arrives, that the maintenance operation is not in execution irrespective of whether or not the logout for the maintenance operation is detected.

5. The management system according to claim 4, wherein the management system is further configured to:
   store policy information indicating whether or not the maintenance operation started before the scheduled start time is valid;
   determine, in a case where the scheduled start time has not arrived yet at a time point when the login for the maintenance operation on the any one of the at least one maintenance target machine is detected, that the maintenance operation is not in execution during a period from the detection of the login for the maintenance operation to the scheduled start time;
   determine, when the policy information indicates that the maintenance operation started before the scheduled start time is valid, that the maintenance operation is in execution after the scheduled start time arrives; and
   determine, when the policy information indicates that the maintenance operation started before the scheduled start time is invalid, that the maintenance operation is not in execution even after the scheduled start time arrives.

6. The management system according to claim 5, wherein the management system is further configured to:
   store a counter associated with each of the at least one maintenance target machine;
   increment, when the login for the maintenance operation on the any one of the at least one maintenance target machine is detected, a value of the counter associated with the any one of the at least one maintenance target machine;
   decrement, when the logout for the maintenance operation on any one of the at least one maintenance target machine is detected, the value of the counter in a case where the value of the counter associated with the any one of the at least one maintenance target machine is larger than an initial value of the counter; and
   determine, even when a current time falls between the scheduled start time to the scheduled finish time, that the maintenance operation is not in execution in a case where every value of the counter associated with the each of the at least one maintenance target machine is the same as the initial value of the counter.

7. The management system according to claim 6, wherein the management system is further configured to:
   transmit predetermined control information to the at least one maintenance target machine when determining that the maintenance operation is in execution on the at least one maintenance target machine; and
   determine whether or not to execute predetermined processing associated with the event transmitted from the at least one maintenance target machine based on whether or not the event includes information indicating that the event is an event that has occurred during the maintenance operation.

8. A control program for a management system stored in a non-transitory, computer-readable medium, the management system comprising an interface coupled to a network, a processor coupled to the interface, and a storage device coupled to the processor, the interface having coupled thereto at least one maintenance target machine to be a target of a maintenance operation, which is identified by one piece of identification information, the management system being configured to store information indicating a scheduled start time and scheduled finish time of the maintenance operation, the control program controlling the processor to execute: a first step of determining, based on the scheduled start time, the scheduled finish time, and a login and logout for the maintenance operation on the at least one maintenance target machine detected by the management system, whether or not the maintenance operation is in execution on the at least one maintenance target machine; and a second step of determining, based on a result of the determination, whether or not to execute predetermined processing associated with an event transmitted from the at least one maintenance target machine.

9. The control program for a management system according to claim 8,
   wherein the management system is further configured to store at least one account for maintenance operation, and
   wherein the first step further comprises detecting a login and logout of any one of the at least one account for maintenance operation as the login and logout for the maintenance operation.

10. The control program for a management system according to claim 8, wherein the first step further comprises determining, in a case where the login for the maintenance operation has not been detected yet in any one of the at least one maintenance target machine at a time point when the scheduled start time arrives, that the maintenance operation is not in execution during a period from the scheduled start time to detection of the login for the maintenance operation on any one of the at least one maintenance target machine, and determining that the maintenance operation is in execution before the scheduled finish time arrives and after the detection of the login for the maintenance operation on the any one of the at least one maintenance target machine.

11. The control program for a management system according to claim 8, wherein the first step further comprises determining, in a case where the maintenance operation is determined to be in execution at a time point when the scheduled finish time arrives, that the maintenance operation is not in execution irrespective of whether or not the logout for the maintenance operation is detected.

12. The control program for a management system according to claim 8,
   wherein the management system is further configured to store policy information indicating whether or not the maintenance operation started before the scheduled start time is valid, and
   wherein the first step further comprises:
      determining, in a case where the scheduled start time has not arrived yet at a time point when the login for the maintenance operation on the any one of the at least one maintenance target machine is detected, that the maintenance operation is not in execution during a period from the detection of the login for the maintenance operation to the scheduled start time;
      determining, when the policy information indicates that the maintenance operation started before the scheduled start time is valid, that the maintenance operation is in execution after the scheduled start time arrives; and determining, when the policy information indicates that the maintenance operation started before the scheduled start time is invalid, that the maintenance operation is not in execution even after the scheduled start time arrives.

13. The control program for a management system according to claim 8, wherein the management system is further configured to store a counter associated with each of the at least one maintenance target machine, and wherein the first step further comprises:

incrementing, when the login for the maintenance operation on the any one of the at least one maintenance target machine is detected, a value of the counter associated with the any one of the at least one maintenance target machine;

decrementing, when the logout for the maintenance operation on any one of the at least one maintenance target machine is detected, the value of the counter in a case where the value of the counter associated with the any one of the at least one maintenance target machine is larger than an initial value of the counter; and determining, even when a current time falls between the scheduled start time to the scheduled finish time, that the maintenance operation is not in execution in a case where every value of the counter associated with the each of the at least one maintenance target machine is the same as the initial value of the counter.

14. The control program for a management system according to claim 8, wherein the control program controls the processor to further execute a third step of transmitting predetermined control information to the at least one maintenance target machine when the management system determines that the maintenance operation is in execution on the at least one maintenance target machine, and wherein the second step further comprises determining whether or not to execute predetermined processing associated with the event transmitted from the at least one maintenance target machine based on whether or not the event includes information indicating that the event is an event that has occurred during the maintenance operation.

* * * * *